United States Patent
Adlers et al.

(10) Patent No.: US 11,657,587 B2
(45) Date of Patent: May 23, 2023

(54) INTELLIGENTLY PLACING LABELS

(71) Applicant: Apple Inc., Cupertino, CA (US)

(72) Inventors: Erik Anders Mikael Adlers, Linkoping (SE); Christopher F. Marrin, Los Altos, CA (US); Elisabeth Lindkvist, Sunnyvale, CA (US); Jeffrey Paul McCurdy Hultquist, Cupertino, CA (US); Ian MacDonald Henderson, II, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 16/361,598

(22) Filed: Mar. 22, 2019

(65) Prior Publication Data

US 2019/0221047 A1 Jul. 18, 2019

Related U.S. Application Data

(60) Continuation of application No. 15/186,406, filed on Jun. 17, 2016, now Pat. No. 10,282,916, which is a
(Continued)

(51) Int. Cl.
*G06T 19/20* (2011.01)
*G01C 21/36* (2006.01)
(Continued)

(52) U.S. Cl.
CPC .......... *G06T 19/20* (2013.01); *G01C 21/3635* (2013.01); *G01C 21/3673* (2013.01);
(Continued)

(58) Field of Classification Search
CPC .............. G01C 21/3667; G01C 21/367; G01C 21/3673; G01C 21/3679; G01C 21/3682;
(Continued)

(56) References Cited

U.S. PATENT DOCUMENTS

| 4,914,605 A | 4/1990 | Loughmiller et al. |
| 6,011,494 A | 1/2000 | Watanabe et al. |

(Continued)

FOREIGN PATENT DOCUMENTS

| EP | 2672225 A2 | 12/2013 |
| EP | 2672226 A2 | 12/2013 |

(Continued)

OTHER PUBLICATIONS

Screen captures from YouTube video clip entitled "Google Maps for iPhone Tips and Tricks," 4 pages, uploaded on Dec. 13, 2012 by user "Pocketnow." Retrieved from Internet <https://www.youtube.com/watch?v=opGiiKqjxdw>.
(Continued)

*Primary Examiner* — Russell Frejd
*Assistant Examiner* — Sara J Lewandroski
(74) *Attorney, Agent, or Firm* — Invoke

(57) ABSTRACT

Some embodiments provide a mapping application that displays a rotation of a 3D map and corresponding rotation of a set of map labels overlaying the 3D map in response to receiving input to rotate the 3D map. When a particular map label in the set of map labels rotates towards an upside down orientation, the mapping application also replaces the particular map label with a version of the particular map label arranged in a right side up orientation to prevent the particular map label from being displayed in the upside down orientation in the 3D map.

27 Claims, 27 Drawing Sheets

Related U.S. Application Data division of application No. 13/907,855, filed on Jun. 1, 2013, now Pat. No. 9,396,697.

(51) Int. Cl.
*G06T 11/00* (2006.01)
*G06T 3/60* (2006.01)
*G09G 5/00* (2006.01)

(52) U.S. Cl.
CPC ............. *G06T 3/60* (2013.01); *G06T 11/00* (2013.01); *G09G 5/00* (2013.01); *G01C 21/3638* (2013.01); *G01C 21/3682* (2013.01); *G01C 21/3691* (2013.01); *G06T 2219/004* (2013.01); *G06T 2219/2016* (2013.01)

(58) Field of Classification Search
CPC ....... G06T 2219/004; G06T 2219/2016; G06T 3/40; G05B 2219/23163; G06F 2203/04806; G06F 2203/04808; G09G 2340/045
See application file for complete search history.

(56) References Cited

U.S. PATENT DOCUMENTS

| | | | |
|---|---|---|---|
| 6,321,158 | B1 | 11/2001 | Delorme et al. |
| 7,076,409 | B2 | 7/2006 | Agrawala et al. |
| 7,599,790 | B2 | 10/2009 | Rasmussen et al. |
| 7,634,354 | B2 | 12/2009 | Salmre |
| 8,355,862 | B2 | 1/2013 | Matas et al. |
| 8,514,252 | B1* | 8/2013 | Oplinger ................ G09G 5/00 345/661 |
| 8,606,516 | B2 | 12/2013 | Vertelney et al. |
| 8,607,167 | B2 | 12/2013 | Matas et al. |
| 8,639,654 | B2 | 1/2014 | Vervaet et al. |
| 8,660,358 | B1 | 2/2014 | Bergboer et al. |
| 8,711,181 | B1* | 4/2014 | Nourse ............ G06F 16/24575 345/660 |
| 8,762,048 | B2 | 6/2014 | Kosseifi et al. |
| 8,896,630 | B1* | 11/2014 | Miller ................ G06T 11/20 345/636 |
| 8,928,700 | B1* | 1/2015 | Khafizova ............ G06F 3/0412 345/661 |
| 8,937,627 | B1* | 1/2015 | Otero ................ G09B 29/006 345/660 |
| 9,043,150 | B2 | 5/2015 | Forstall et al. |
| 9,766,712 | B2 | 9/2017 | Schpok |
| 10,140,003 | B1* | 11/2018 | Khafizova ............ G06T 3/0025 |
| 2003/0234782 | A1 | 12/2003 | Terentyev et al. |
| 2004/0032417 | A1 | 2/2004 | Chen et al. |
| 2004/0158395 | A1 | 8/2004 | Yamada et al. |
| 2005/0143914 | A1* | 6/2005 | Yamada ................ G09B 29/106 340/995.27 |
| 2005/0243104 | A1 | 11/2005 | Kinghorn |
| 2006/0026535 | A1* | 2/2006 | Hotelling ............ G06F 3/0488 715/863 |
| 2006/0058949 | A1* | 3/2006 | Fogel ................ G01C 21/3673 345/629 |
| 2007/0229541 | A1 | 10/2007 | Klassen et al. |
| 2007/0273712 | A1 | 11/2007 | O'Mullan et al. |
| 2008/0114543 | A1* | 5/2008 | Vishnu ................ G01C 21/26 701/533 |
| 2008/0235628 | A1 | 9/2008 | Faught |
| 2009/0181650 | A1* | 7/2009 | Dicke ............ H04M 1/72406 345/689 |
| 2009/0263026 | A1 | 10/2009 | Verne et al. |
| 2010/0309149 | A1 | 12/2010 | Blumenberg et al. |
| 2011/0018695 | A1* | 1/2011 | Bells ............... G06F 3/016 345/173 |
| 2011/0050619 | A1* | 3/2011 | Griffin ............... G06F 3/044 345/174 |
| 2011/0074710 | A1* | 3/2011 | Weeldreyer .......... G06F 3/0481 345/173 |
| 2011/0102464 | A1* | 5/2011 | Godavari ............ G06F 3/0416 345/650 |
| 2011/0161875 | A1 | 6/2011 | Kankainen |
| 2011/0161892 | A1* | 6/2011 | Hamadene ........... G06F 3/0485 715/863 |
| 2011/0167058 | A1 | 7/2011 | Van Os |
| 2011/0202834 | A1* | 8/2011 | Mandryk ........... G06F 3/04883 715/800 |
| 2011/0313649 | A1* | 12/2011 | Bales .................... G01C 21/367 345/589 |
| 2012/0019513 | A1* | 1/2012 | Fong ....................... G06T 17/05 345/419 |
| 2012/0245841 | A1 | 9/2012 | Spindler et al. |
| 2012/0316782 | A1* | 12/2012 | Sartipi ................ G01C 21/367 345/667 |
| 2013/0002705 | A1 | 1/2013 | Cornell |
| 2013/0162534 | A1 | 6/2013 | Chen et al. |
| 2013/0176384 | A1 | 7/2013 | Jones et al. |
| 2013/0275042 | A1 | 10/2013 | Park |
| 2013/0321450 | A1* | 12/2013 | Hultquist ............. G01C 21/367 345/619 |
| 2013/0325343 | A1 | 12/2013 | Blumenberg et al. |
| 2014/0002374 | A1* | 1/2014 | Hunt ..................... G06F 3/0488 345/173 |
| 2014/0075286 | A1* | 3/2014 | Harada ................. G06F 40/103 715/234 |
| 2014/0085237 | A1* | 3/2014 | Choi .................... G06F 3/04845 345/173 |
| 2014/0111456 | A1* | 4/2014 | Kashiwa ............. G06F 3/04883 345/173 |
| 2014/0240242 | A1* | 8/2014 | Kawalkar ............ G06F 3/0418 345/173 |
| 2014/0244402 | A1 | 8/2014 | Binas et al. |
| 2014/0329549 | A1 | 11/2014 | Dicke |
| 2014/0354629 | A1 | 12/2014 | Adlers et al. |
| 2014/0375648 | A1* | 12/2014 | Katakawa ................ G06T 1/20 345/428 |
| 2015/0002536 | A1 | 1/2015 | Mendis |
| 2015/0070397 | A1* | 3/2015 | Miller .................. G09B 29/006 345/660 |
| 2015/0088416 | A1 | 3/2015 | Goddard |
| 2015/0178977 | A1 | 6/2015 | Kontkanen |
| 2015/0187100 | A1 | 7/2015 | Berry et al. |
| 2015/0187337 | A1* | 7/2015 | Baxter ............... G01C 21/3673 345/660 |
| 2015/0241239 | A1 | 8/2015 | Van et al. |
| 2016/0071496 | A1 | 3/2016 | Jones et al. |
| 2017/0277670 | A1* | 9/2017 | Smith .................... G06F 16/29 |
| 2018/0052596 | A1* | 2/2018 | Bemel-Benrud ..... G06T 11/206 |

FOREIGN PATENT DOCUMENTS

| | | |
|---|---|---|
| JP | 11-038868 A | 2/1999 |
| JP | 2008-158842 A | 7/2008 |
| WO | 2011/146141 A1 | 11/2011 |
| WO | 2012/034581 A1 | 3/2012 |
| WO | 2013/184348 A2 | 12/2013 |
| WO | 2013/184444 A2 | 12/2013 |
| WO | 2013/184446 A2 | 12/2013 |
| WO | 2013/184449 A2 | 12/2013 |

OTHER PUBLICATIONS

Ruhs, Chris, "My Favorite Android Apps: Maps," Jun. 24, 2011, 1 page, available at http://www.youtube.com/watch?v=v2aRkLkLT3s.
Author Unknown, "Google Maps—Two Finger Rotate in Nexus One," androidapk, Apr. 9, 2011, 1 page, available at http://www.youtube.com/watch?v=f7VNoErYNt8.
Author Unknown, "Google Maps Voice Navigation in Singapore," software2tech, Jul. 20, 2011, 1 page, available at http://www.youtube.com/watch?v=7B9JN7BkvME.
Author Unknown, "Garmin. nuvi 1100/1200/1300/1400 series owner's manual," Jan. 2011, 72 pages, Garmin Corporation, No. 68, Jangshu 2.sup.nd Road, Sijhih, Taipei County, Taiwan.
Author Unknown, "Android 2.3.4 User's Guide", May 20, 2011, pp. 1-384, Google, Inc.

(56) References Cited

OTHER PUBLICATIONS

Author Unknown, "'Touch & Go' Owner's Manual," Jul. 2011, 218 pages, Toyota, United Kingdom.

* cited by examiner

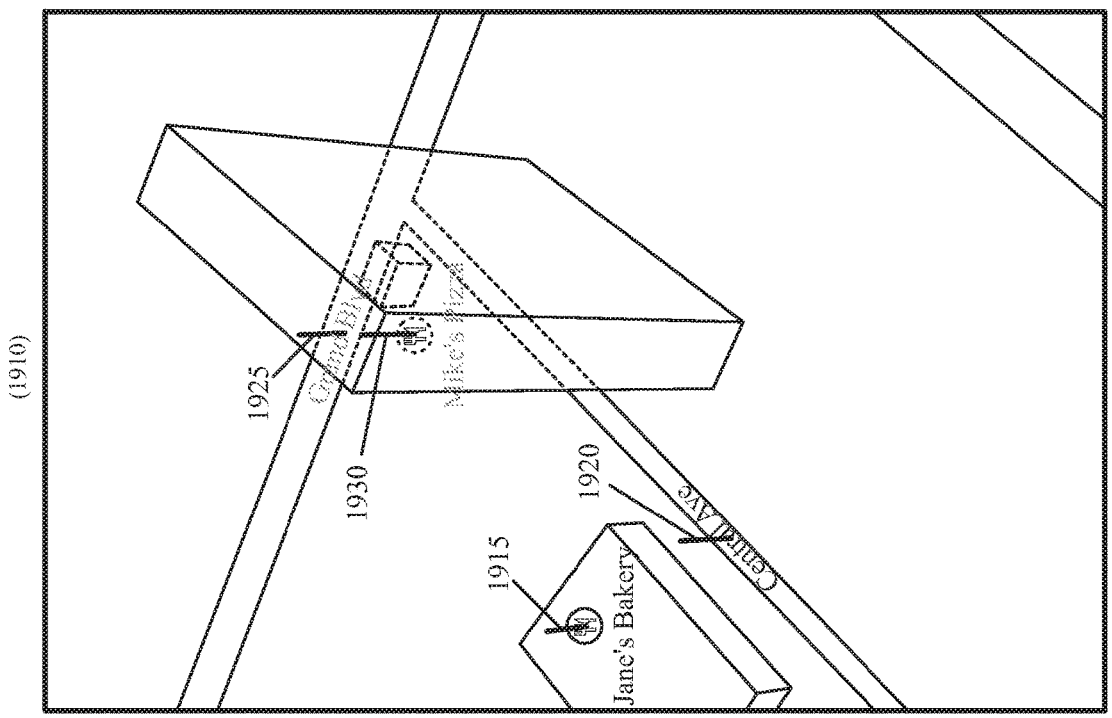
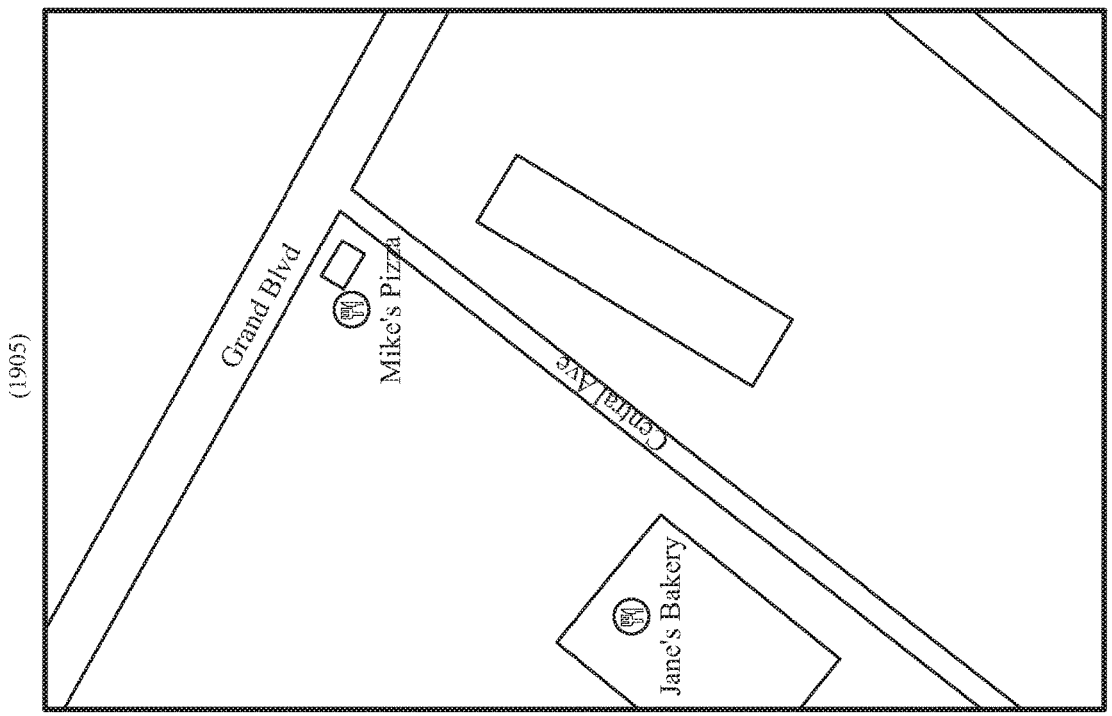
Figure 19

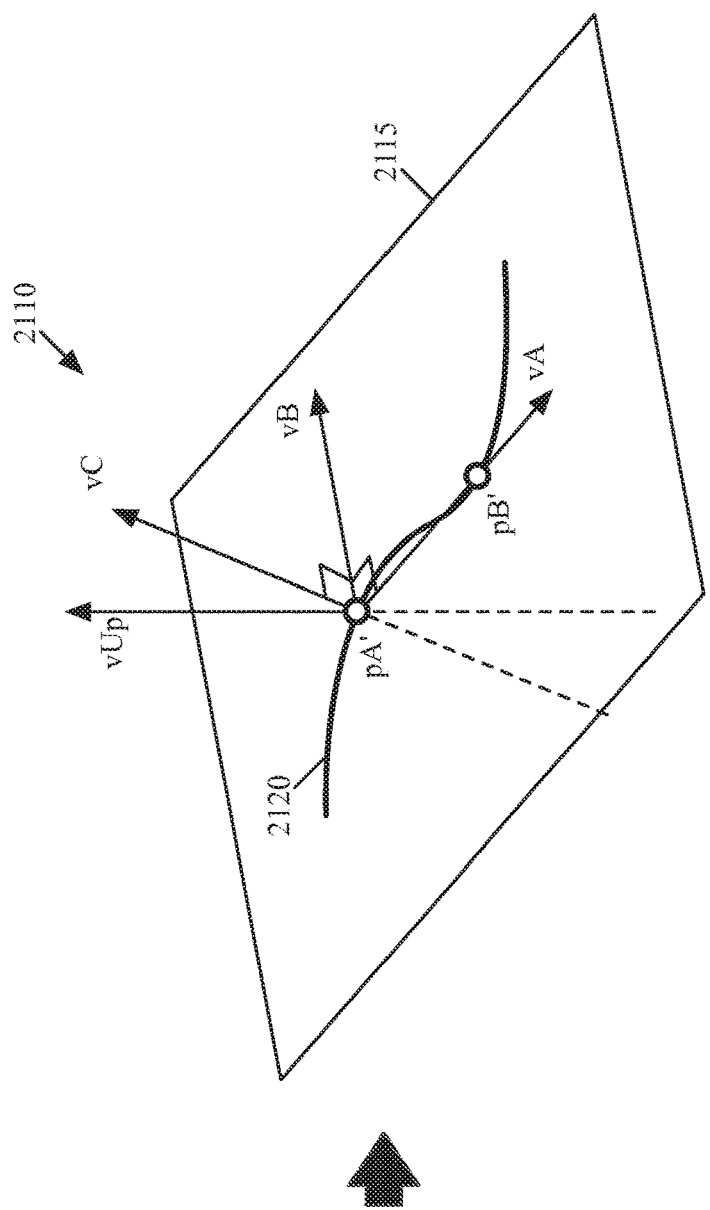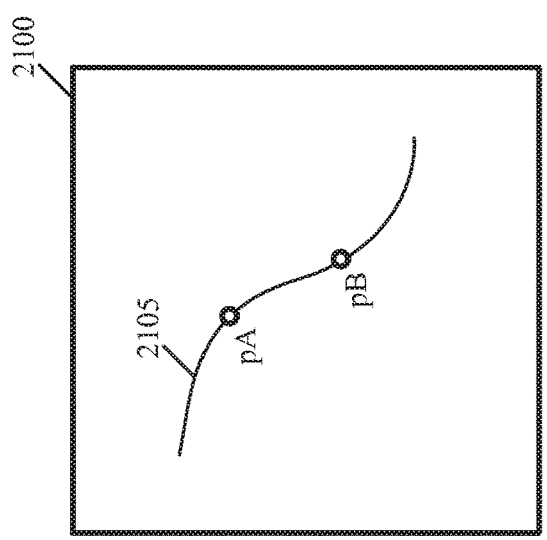
Figure 21

INTELLIGENTLY PLACING LABELS

INCORPORATION BY REFERENCE DISCLAIMER

Each of the following applications are hereby incorporated by reference: application Ser. No. 15/186,406 filed on Jun. 17, 2016; application Ser. No. 13/907,855 filed on Jun. 1, 2013. The Applicant hereby rescinds any disclaimer of claim scope in the parent application or the prosecution history thereof and advises the USPTO that the claims in this application may be broader than any claim in the parent application.

BACKGROUND

Many map-based applications are available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes the relative location of streets, highways, points of interest, etc. in the map.

Some map-based applications provide different types of views of the map and allow to select a type of view for the application to use to display the map. Examples of such types of views include a map view, a satellite view, a hybrid view, etc. For some or all of the different types of views of the map, a number of map-based applications provide a two-dimensional (2D) viewing mode, a three-dimensional (3D) viewing mode, or both viewing modes.

BRIEF SUMMARY

Some embodiments of the invention provide a novel mapping application renders views of a map (also referred to as a map view) and intelligently places and/or renders map labels for map elements and/or constructs in the map. In some embodiments, the mapping application renders such map views when the mapping application is in a standard-viewing mode or a hybrid-viewing mode. The map labels of some embodiments includes road path indicators, road labels, road direction indicators, points of interest (POI) indicators, POI labels, city labels, city indicators, state labels, continent labels, body of water labels, etc.

In some embodiments, the mapping application includes many features to intelligently place and/or render map labels for views of the map. One feature of the mapping application of some embodiments involves preventing map labels from appearing upside down or in an upside down like orientation when rendering the map labels. For instance, when a user rotates the map view, the mapping application also rotates certain types of map labels (e.g., road labels) along with the map. As such map labels rotate towards an upside down orientation, the mapping application flips the map labels so that the map labels appear right side up.

Another feature that the mapping application of some embodiments provides involves rendering road labels so that no two map labels collide with each other nor overlap each another. In this manner, the mapping application prevents map labels to obscure other map labels, confusion as to the map elements and/or constructs to which map labels are associated, map labels that are difficult to read or are illegible, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims, However, for purposes of explanation, several embodiments of the invention are set forth in the following figures.

FIG. 19 conceptually illustrates examples of occluded map labels in a map view of a 3D map.

FIG. 21 conceptually illustrates an example determining a slope of a road on which to place of a road label.

DETAILED DESCRIPTION

In the following detailed description of the invention, numerous details, examples, and embodiments of the invention are set forth and described. However, it will be clear and apparent to one of ordinary skill in the art that the invention is not limited to the embodiments set forth and that the invention may be practiced without some of the specific details and examples discussed.

Some embodiments of the invention provide a novel mapping application renders views of a map and intelligently places and/or renders map labels for map elements and/or constructs in the map. In some embodiments, the mapping application renders such map views when the mapping application is in a standard-viewing mode or a hybrid-viewing mode. The map labels of some embodiments includes road path indicators, road labels, road direction indicators, points of interest (POI) indicators, POI labels, city labels, city indicators, state labels, continent labels, body of water labels, etc.

In some embodiments, the mapping application includes many features to intelligently place and/or render map labels for views of the map. One feature of the mapping application of some embodiments involves preventing map labels from appearing upside down or in an upside down like orientation when rendering the map labels. For instance, when a user rotates the map view, the mapping application also rotates certain types of map labels (e.g., road labels) along with the map. As such map labels rotate towards an upside down orientation, the mapping application flips the map labels so that the map labels appear right side up.

Figure 1:
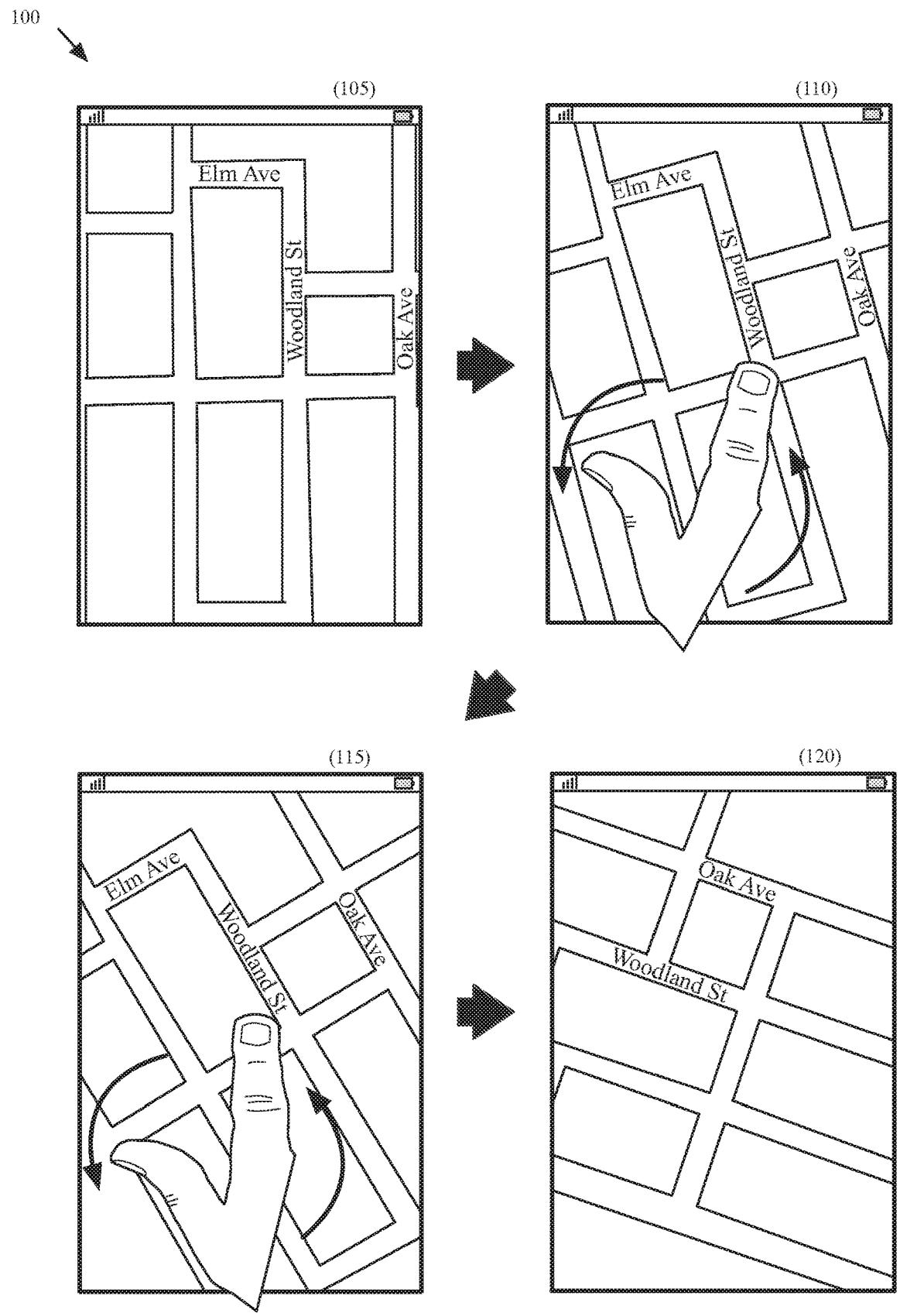
FIG. 1 conceptually illustrates a mapping application of some embodiments rendering map labels when rotating map labels.

FIG. 1 conceptually illustrates a mapping application of some embodiments rendering map labels when rotating map labels. in particular, FIG. 1 illustrates a graphical user interface (GUI) 100 of the mapping application of some embodiments operating on a device (e.g., a mobile device, a table computing device, etc.) at four different stages 105-120 of rotating a view of a map.

The first stage 105 shows the GUI 100 displaying a view of the map. In some embodiments, map view is a view of a 2D map while, in other embodiments, or the map view is a top-down view of a 3D map. As shown, the map view includes several roads and three road labels indicating the names of roads ("Elm Ave", "Woodland St", and "Oak Ave" in this example) that the mapping application overlays on the corresponding roads.

Different embodiments of the mapping application render different types of map labels using different techniques. For instance, the mapping application of some embodiments renders map views by superimposing 2D map labels (e.g., road labels, POI labels, POI labels, etc.) over rendered map views of the map. That is, in some such embodiments, the mapping application renders a map view of the map and then adds 2D map labels to the rendered map view by overlaying the 2D map labels onto the map view.

For 3D maps, the mapping application in some embodiments adds polygons that represent map labels (e.g., road path indicators) to the 3D map and renders map views of the 3D map with the added polygons. In other words, in some such embodiments, the mapping application adds map labels to the 3D map before the mapping application renders map views of the 3D map. In some embodiments, the map labels are part of the 3D map (as opposed to adding the map labels to the 3D map) and the mapping application renders the map labels that are to be displayed in the map view. For map labels that are not to be rendered in the map view, the mapping application of some such embodiments ignores such map labels that the mapping application rendering in the map view of the 3D map.

The second stage 110 illustrates a user performing a rotate operation in order to rotate the view of the map. In this example, the user is providing a multi-touch gesture by placing two fingers on a touchscreen of the device on which the mapping application is operating and rotating the two fingers in a counter-clockwise direction about a location on the touchscreen (e.g., a midpoint between an initial pair of points where the two fingers touch the touchscreen) in order to rotate the map view in a counter-clockwise direction.

When the mapping application receives input (a multi-touch gesture provided through the touchscreen of the device in this example) to rotate the map view, the mapping application of some embodiments rotates the map view along with the road labels in the map view. As illustrated in the second stage 110, the mapping application rotates the road labels "Elm Ave", "Woodland St", and "Oak Ave" in a counter-clockwise direction about the center of the road labels.

In some embodiments, while the mapping application rotates the map view, the mapping application flips a particular road label right side up along a horizontal axis of the particular road label when (1) the particular road label rotates towards an upside down orientation with respect to the GUI 100 and (2) an angle formed by a vector along the particular road label and a vertical axis of the GUI 100 passes a threshold angle (e.g., 10 degrees, 15 degrees, 25 degrees, etc.). The mapping application of some embodiments flips the particular road label right side up by cross fading the particular road label and a right side up version of the particular road label. Specifically, the mapping application of some such embodiments fades out the particular road label that is increasingly rotating towards the upside down orientation while fading in the right side up version of the particular road label. In some embodiments, the mapping application uses additional and/or different techniques to transition from displaying an upside down road label to displaying a right side up version of the road label.

The third stage 115 illustrates the GUI 100 after the mapping application has flipped several road labels illustrated in the first and second stages 105 and 110. As shown, the mapping application in this example has flipped the road labels "Woodland St" and "Oak Ave" as a result of the rotate operation performed by the user in the second stage 110. In addition, the third stage 115 shows the user continuing to perform performing the rotate operation on the map view.

The fourth stage 120 shows the GUI 100 after the user has completed the rotate operation on the map view. As illustrated, the road labels "Woodland. St" and "Oak Ave" are rotate further counter-clockwise compared the third stage 115. Additionally, the fourth stage 120 illustrates that the road label "Elm Ave" has been rotated out of view.

Another feature that the mapping application of some embodiments provides involves rendering road labels so that no two map labels collide with each other nor overlap each another. in this manner, the mapping application prevents map labels to obscure other map labels, confusion as to the map elements and/or constructs to which map labels are associated, map labels that are difficult to read or are illegible, etc.

Figure 2:
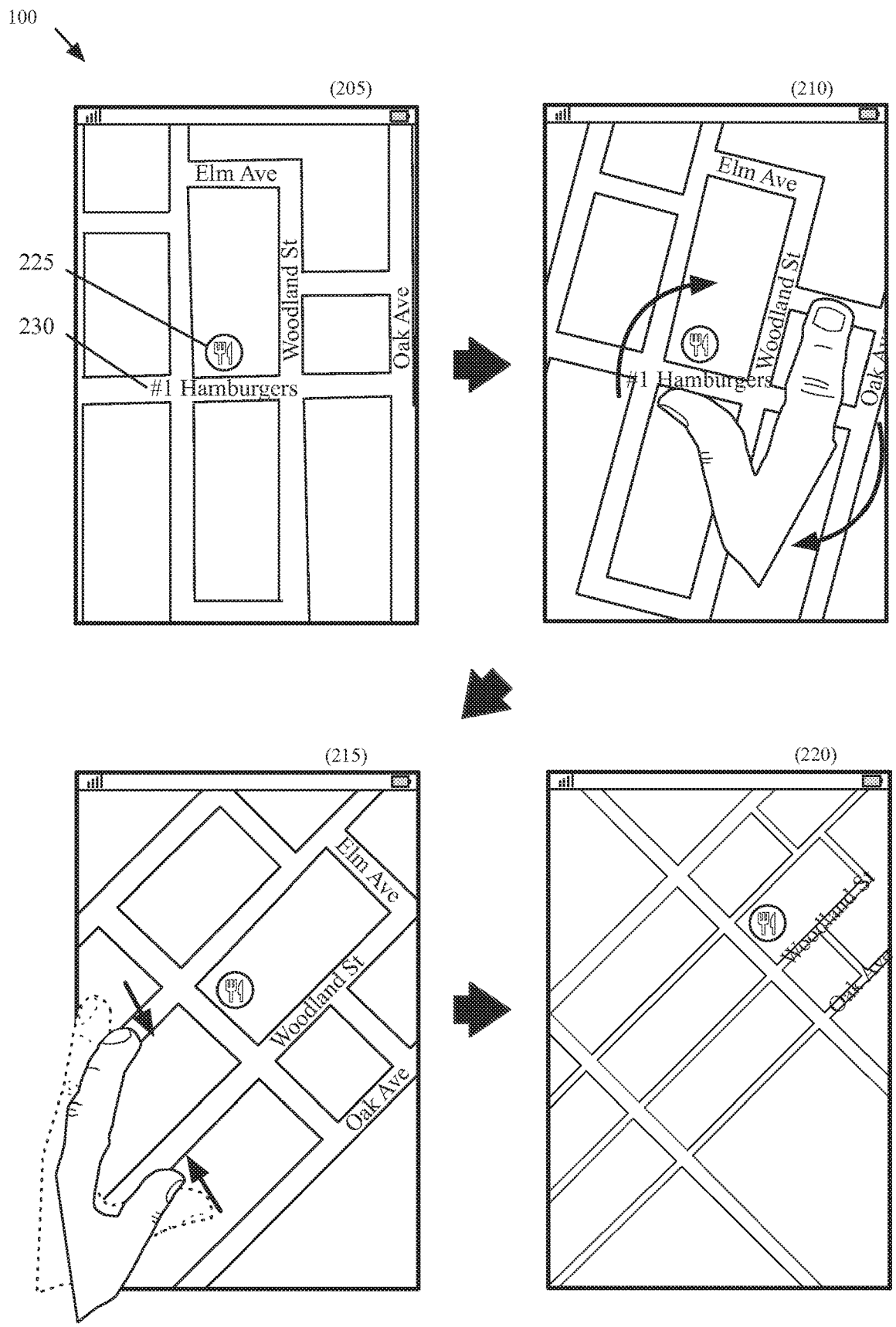
FIG. 2 conceptually illustrates a mapping application of some embodiments rendering map labels when map labels collide.

FIG. 2 conceptually illustrates a mapping application of some embodiments rendering map labels when map labels collide. Specifically, FIG. 2 illustrates the GUI 100 of the mapping application of some embodiments operating on a device (e.g., a mobile device, a table computing device, etc.) at four different stages 205-220 of manipulating the view of a map.

The first stage 205 is similar to the first stage 105 described above by reference to FIG. 1. That is, the first stage 205 shows a map view that includes several roads and the road labels "Elm Ave", "Woodland St", and "Oak Ave" that the mapping application overlays on the corresponding roads. In addition, the map view in the first stage 205 includes a POI map label, In some embodiments, a POI map label includes two components: a POI indicator 225 for indicating the location of the POI on the map and a POI label 230 that indicates the name of the POI ("#1 Hamburgers" in this example).

The second stage 210 shows a user performing a rotate operation in order to rotate the view of the map. The user for this example is providing a multi-touch gesture by placing two fingers on a touchscreen of the device on which the mapping application is operating and rotating the two fingers in a clockwise direction about a location on the touchscreen (e.g., a midpoint between an initial pair of points where the two fingers touch the touchscreen) in order to rotate the map view in a clockwise direction.

When the mapping application receives input (a multi-touch gesture provided through the touchscreen of the device in this example) to rotate the map view, the mapping application of some embodiments rotates the map view along with the road labels in the map view. As shown in the second stage 210, the mapping application rotates the road labels "Elm Ave", "Woodland St", and "Oak Ave" in a clockwise direction about the center of the road labels. The second stage 210 also illustrates that the POI label "#1 Hamburger" is about to collide with the road label "Woodland St".

If the mapping application of some embodiments manipulates the map view, the mapping application detects whether any map labels collide or overlap each other in the new map view. When the mapping application detects a set of map labels colliding or overlapping as a result of the rotation of the map view, the mapping application in some embodiments determines one of the map labels in the set of map labels to be rendered in the map view and ignores the remaining map labels in the set of overlapping map labels.

In some embodiments, the mapping application determines the map label in the set of overlapping map labels to render based on a style sheet that specifies a map label to be rendered from a set of colliding map labels. Different embodiments use different criteria to specify the map label to be rendered from the set of colliding map labels. For example, in some embodiments, the style sheet specifies the map label to be rendered based on the type of map labels (e.g., road labels are to be rendered when road labels collide with POI labels and/or POI indicators, city labels are to be rendered when city labels collide with road labels, state labels are to be rendered when state labels collide with city labels, etc.) selected when in the set of colliding map labels. Alternatively, or in conjunction, the style sheet of some embodiments specifies the same or similar type of map labels according to a defined hierarchy. For instance, when road labels collide, the style sheet of some such embodiments specifies to select highways, then expressways, then arterial roads, then collector roads, then back roads, etc. When map label at the same level of the defined hierarchy collide (e.g., highway road labels colliding, expressway road labels colliding, arterial road labels colliding, collector road labels colliding, back road labels colliding, etc.) the mapping application of some embodiments randomly selects a map label to be rendered.

The third stage 215 illustrates the GUI 100 after the user has completed the rotate operation on the map view. For this example, the mapping application detected that the POI label "#1 Hamburger" was colliding with the road label "Woodland St", selected the road label "Woodland St" to be rendered, and ignored the POI label "#1 Hamburger". Since the road label "Woodland. St" does not collide with the POI indicator 225, the mapping application still renders the POI indicator in the map view, as shown in the third stage 215. The mapping application in this example did not detect the road labels "Elm Ave" and "Oak Ave" colliding with any other map labels and, thus, continues to render those road labels.

Additionally, the third stage 215 illustrates the user performing a zoom operation in order to zoom out from the view of the map (i.e., to view the map from a farther distance). In this example, the user is providing a multi-touch gesture by placing two fingers on a touchscreen of the device and moving the two fingers in towards each other in order to zoom out from the map view.

As explained above, when the mapping application of some embodiments manipulates the map view, the mapping application detects whether any map labels collide or overlap each other in the new map view. The third stage 215 illustrates an example of map labels that collide as a result of a zoom operation (as opposed to a rotate operation shown in the second stage 210). If the mapping application detects a set of map labels colliding or overlapping as a result of the zooming out from the map view, in some embodiments the mapping application determines one of the map labels in the set of map labels to be rendered in the map view and ignores the remaining map labels in the set of overlapping map labels in a similar fashion as that described above by reference to the second stage 210.

The fourth stage 220 illustrates the GUI 100 after the user has completed the zoom operation on the map view. The mapping application in this example detected that the road label "Elm Ave" was colliding with the road label "Woodland St", selected the road label "Woodland St" to be rendered, and ignored the road label "Elm Ave". Also, the mapping application in this example did not detect the road label "Oak Ave" colliding with any other map labels and, therefore, continues to render that road label.

In some embodiments, the mapping application includes several different viewing modes that a user may select for viewing a map. For instance, the mapping application of some embodiments provides a standard-viewing mode, a satellite-viewing mode, and a hybrid-viewing mode for viewing the map. Other embodiments may provide additional and/or different viewing modes.

When the mapping application is in a satellite-viewing mode, the mapping application of some embodiments renders map views using camera-captured images (CCIs). In some embodiments, CDs are images of the real world captured by real cameras operated by humans and/or machines (as opposed to a virtual camera that is used for rendering views of a 3D model). CCIs include images captured by real cameras on satellites, fly-by captured images (e.g., images captured by real cameras on airplanes, space shuttles, helicopters, balloons, and/or any other device used for aerial photography), drive-by captured images (e.g., images captured by real cameras on cars, trucks, motorcycles, buses, bicycles, trains, and/or any other type of vehicle that operates on land), etc. CCIs are referred to as real world captured images in some embodiments. The mapping application of some embodiments renders satellite map views by texture mapping CCIs to the map, map elements, and/or map constructs in the 3D map.

In some embodiments, a map service generates 3D model of a map that represents the real world based on geographical data collected from the real world. Some or all of the 3D primitives (e.g., points, lines, polygons, surfaces, etc.) of the 3D model of the map include location data that maps the to the corresponding location in the real world. In some embodiments, when a capturing device (e.g., a real camera) captures CCIs, the capturing device also records the location (e.g., UPS data) and position of the capturing device.

Based on information regarding the location and position of a capturing device used to capture a particular CCI, the map service of some embodiments identifies positions in the 3D model of the map to which pixels and/or groups of pixels in the particular CCI correlate. In some embodiments, the map service then maps the particular CCI to the 3D model of the map based on the identified positions. Such mapping, in some embodiments, is referred to as texture mapping. In some embodiments, the map service manipulates (e.g., rotated, translated, scaled, etc.) the particular CCI to better align the elements in the particular CCI with corresponding elements in the 3D model of the map.

In some embodiments, the mapping application renders map views using the 3D model of the map textured with CCIs by accessing (e.g., through the Internet) the map service described above and retrieving data (e.g., stored as satellite map tiles) representing a portion of the 3D model of the map from which the mapping application renders the map views. The data includes in some embodiments polygons that represent the map elements and/or map constructs in the portion of the 3D model and the corresponding CCIs with which the mapping application texture maps to the polygons. Such rendering is referred to in some embodiments as stereographic rendering using on CCIs. In some embodiments, the mapping application renders such map views of the 3D model of the map when the mapping application is in a satellite-viewing mode and rendering 3D satellite map views described in this application. Details of generating 3D maps with CCIs are described in PCT Application PCT/EP2011/054155, entitled "3D Streets." PCT Application PCT/EP2011/054155 is incorporated herein by reference.

In some embodiments, when the mapping application is in a hybrid-viewing mode, the mapping application renders map views using CCIs and map labels for map elements and/or constructs in the map view. For instance, the mapping application of some embodiments uses the same or a similar technique described above for rendering map views in the satellite-viewing mode (i.e., texture mapping CCIs to the map, map elements, and/or map constructs in the 3D map) and augments such map views with map labels. That is, the mapping application of some such embodiments texture maps CCIs to the map, map elements, and/or map constructs in the 3D map and adds map labels to the map view in order to annotate some or all of the map elements (streets, highways, POIs, cities, states, countries, continents, bodies of water, etc.) in the map view.

When the mapping application is in a standard-viewing mode, the mapping application of some embodiments renders map views using non-CCIs (e.g., user-generated textures/images, machine-generated textures/images, etc.) and map labels for map elements and/or constructs in the map view. In other words, the mapping application of some such embodiments renders map views without using any CCIs for the standard-viewing mode adds map labels to the map view in order to annotate some or all of the map elements in the map view.

Figure 3:
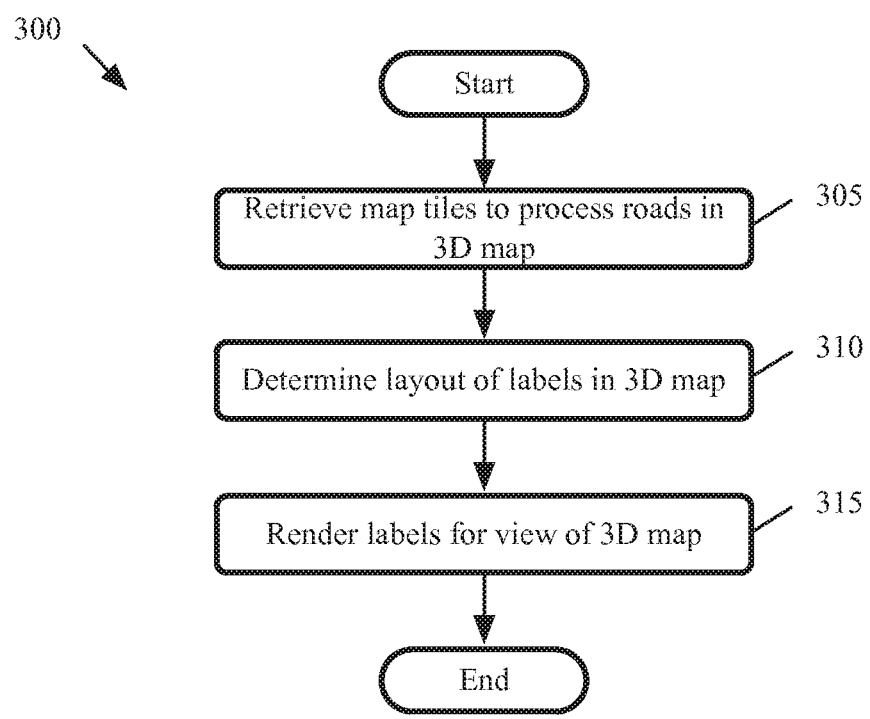
FIG. 3 conceptually illustrates an overall process of some embodiments for rendering map labels for a map view.

FIG. 3 conceptually illustrates an overall process 300 of some embodiments for rendering map labels for a map view. In some embodiments, the mapping applications described above and below by reference to FIGS. 1, 2, 19, 22, and 25 performs the process 300 when rendering map labels for a map view. The mapping application of some embodiments renders map labels for a map view when the mapping application is in a hybrid-viewing mode or a standard-viewing mode.

The process 300 starts by retrieving (at 305) map tiles to process roads in a 3D map so that the roads can be later annotated with map labels. In some embodiments, the process 300 retrieves the map tiles from a map service, such as the map service described above. The map tiles in some embodiments provide road data that describes the roads in the requested portion of the map. Such map tiles may be referred to as road tiles in this application. In some embodiments, 3D data (e.g., polygon data, mesh data, etc.) that describes the map elements and/or map constructs (e.g., buildings, foliage, bodies of water, etc.) in the 3D map are stored in a set of map tiles separate from the road tiles. The road tiles of some embodiments include a portion of the 3D data that describes the map elements and/or map constructs in 3D map. For instance, in some such embodiments, the map tiles of some embodiments that include the road. data for the 3D map also include data for land in the 3D map and data for the remaining map elements and/or map constructs in the 3D map are stored in separate map tiles. Still, in some embodiments, the road data for the 3D map and the 3D data that describes the map elements and/or map constructs in 3D map are stored in a single set of map tiles.

In some embodiments, the retrieved map tiles for processing roads provides data for a range or band of zoom levels (i.e., distances from the 3D map). For example, the retrieved map tiles of some embodiments might be specified for use for zoom levels 11-15, zoom levels 16-20, or any other defined range of zoom levels.

The process 300 of some embodiments performs a variety of operations to process the roads using road data in the map tiles including assembling the roads, identifying road segments, determining styling for map labels, determining sizes of map labels, and identifying candidate positions along the road segments at which to potentially place map labels, among other operations. Details of processing roads is described below by reference to FIGS. 4-6.

In some embodiments, the process 300 performs 305 as part of a tile loading processing that the process 300 or another process performs. The tile loading process of some such embodiments is for processing and loading tiles of the portion of the 3D map that is used to render a map view.

Next, the process 300 then determines (at 310) a layout of map labels for the 3D map. The process 300 of some embodiments determines and generates the layout of map labels for the 3D map based on a virtual camera that is used to identify a position in the 3D map from which to render a view of the 3D map. In some embodiments, a virtual camera is a conceptualization of the position in the 3D map from which the mapping application renders a map view of the 3D map.

In some embodiments, the process 300 determines the layout by selecting positions at which to place labels based on the identified candidate positions and the position and orientation of the virtual camera. As part of determining the layout, the process 300 of some embodiments determines the position and orientation of each character (i.e., a glyph) for map labels of roads that contain strings (e.g., road names). Details of determining the layout of map labels for the 3D map is described below by reference to FIGS. 7-18.

Finally, the process 300 renders (at 315) map labels for the 3D map. The process 300 of different embodiments renders map labels using different techniques. For instance, in some embodiments, the process 300 renders map labels for the 3D map by superimposing 2D map labels (e.g., road labels, POI labels, POI labels, etc.) over rendered map views of the map. That is, in some such embodiments, the mapping application renders a map view of the map and then adds 2D map labels to the rendered map view by overlaying the 2D map labels onto the map view.

Alternatively, or in conjunction, the process 300 of some embodiments renders map labels for the 3D map by adding polygons that represent map labels (e.g., road path indicators) to the 3D map and rendering map views of the 3D map with the added polygons. In other words, in some such embodiments, the process 300 adds map labels to the 3D map before the process 300 renders map views of the 3D map. In some embodiments, the map labels are part of the 3D map (as opposed to adding the map labels to the 3D map) and the process 300 renders the map labels that are to be displayed in the map view. For map labels that are not to be rendered in the map view, the process 300 of some such embodiments ignores such map labels when the process 300 is rendering map labels for the 3D map.

Several more detailed embodiments of the invention are described in the sections below. Section I conceptually describes details of processing roads for map labels according to some embodiments. Next, Section II conceptually describes determining layouts of map labels according to some embodiments of the invention. Section III describes rendering map labels for map views according to some embodiments of the invention. Next, Section IV describes example electronic systems with which some embodiments of the invention are implemented. Finally, Section V describes a map service operating environment in which some embodiments of the invention operate.

II. Processing Roads for Map Labels

Figure 4:
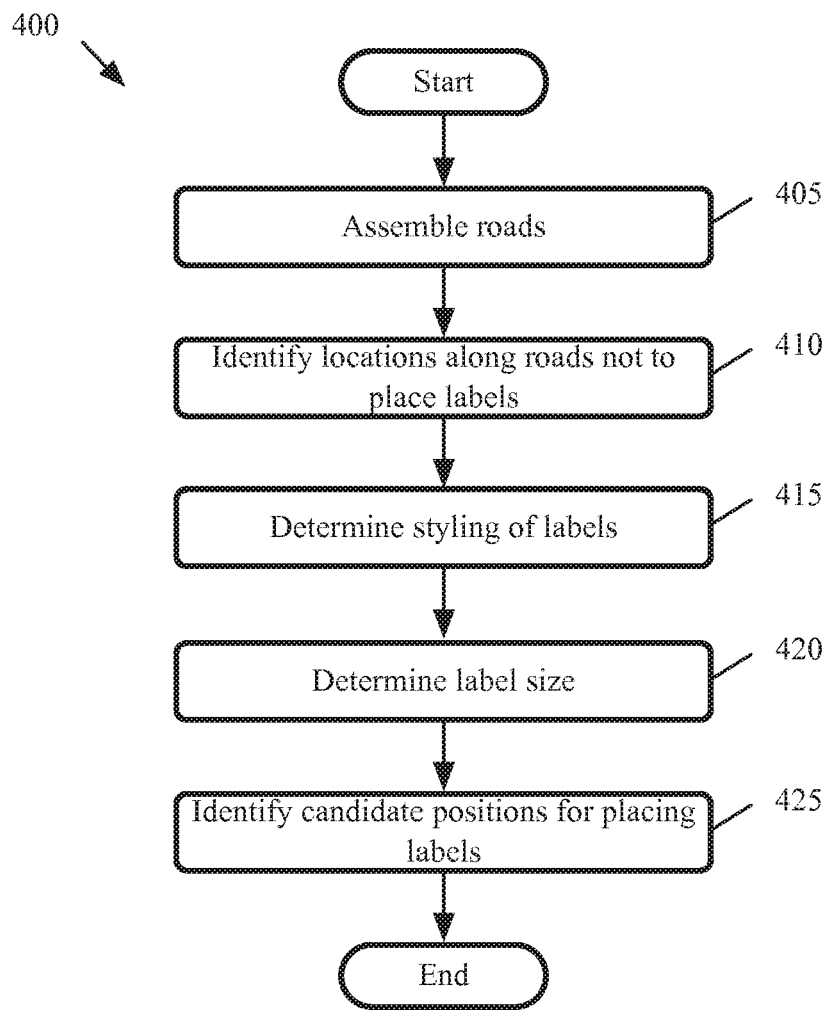
FIG. 4 conceptually illustrates a process of some embodiments for processing roads for map labels in a 3D map.

As mentioned above, the mapping application of some embodiments processes roads for map labels in a map in order to render the map labels in a view of the map. FIG. 4 conceptually illustrates a process 400 of some embodiments for processing roads for map labels in a 3D map. In some embodiments, the mapping application described above and below by reference to FIGS. 1, 2, 19, 22, and 25 performs the process 400. The mapping application of some embodiments performs the process 400 as part of operation 305 described above by reference to FIG. 3.

Figure 5:
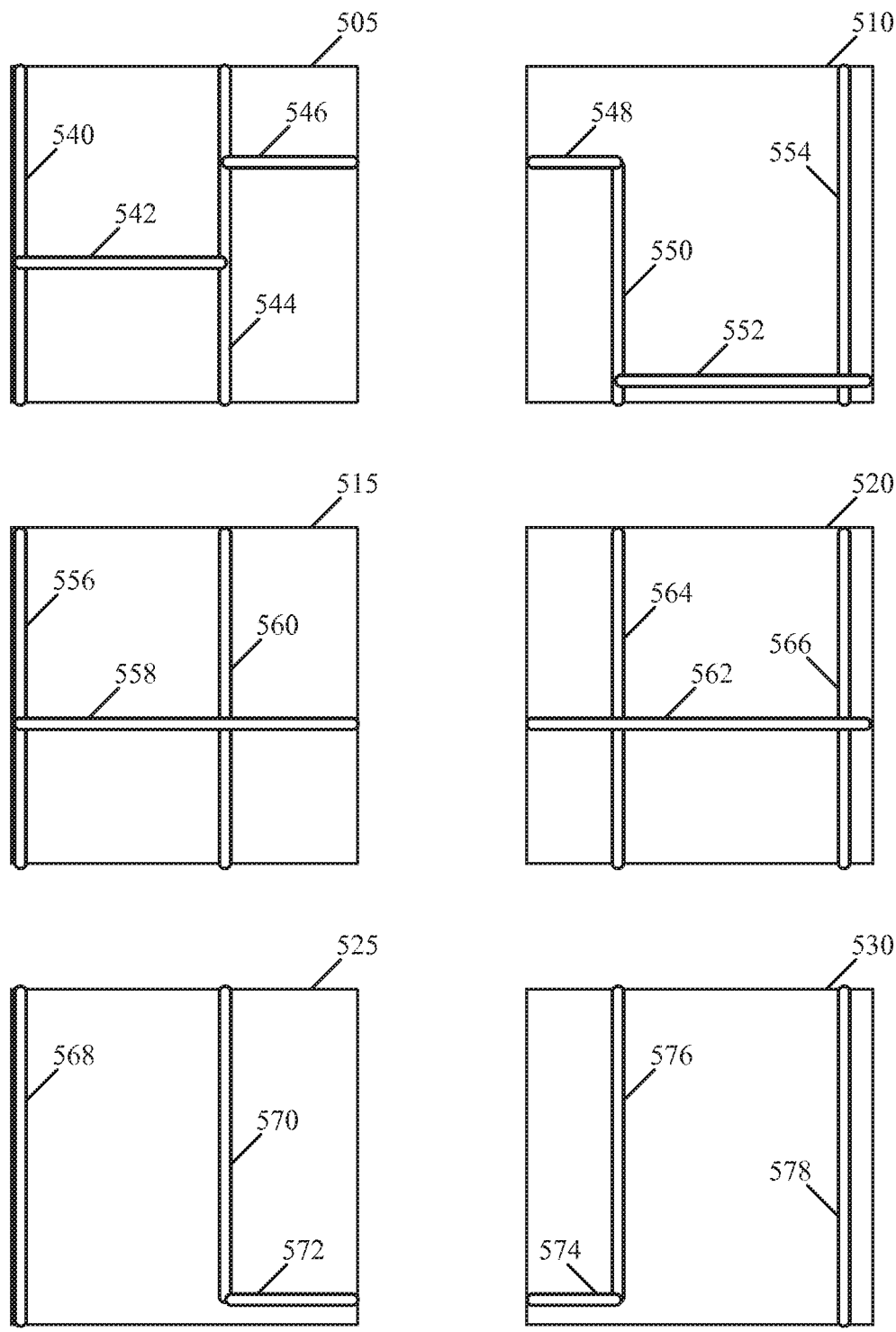
FIG. 5 conceptually illustrates map tiles for roads in a map according to some embodiments of the invention.
Figure 6:
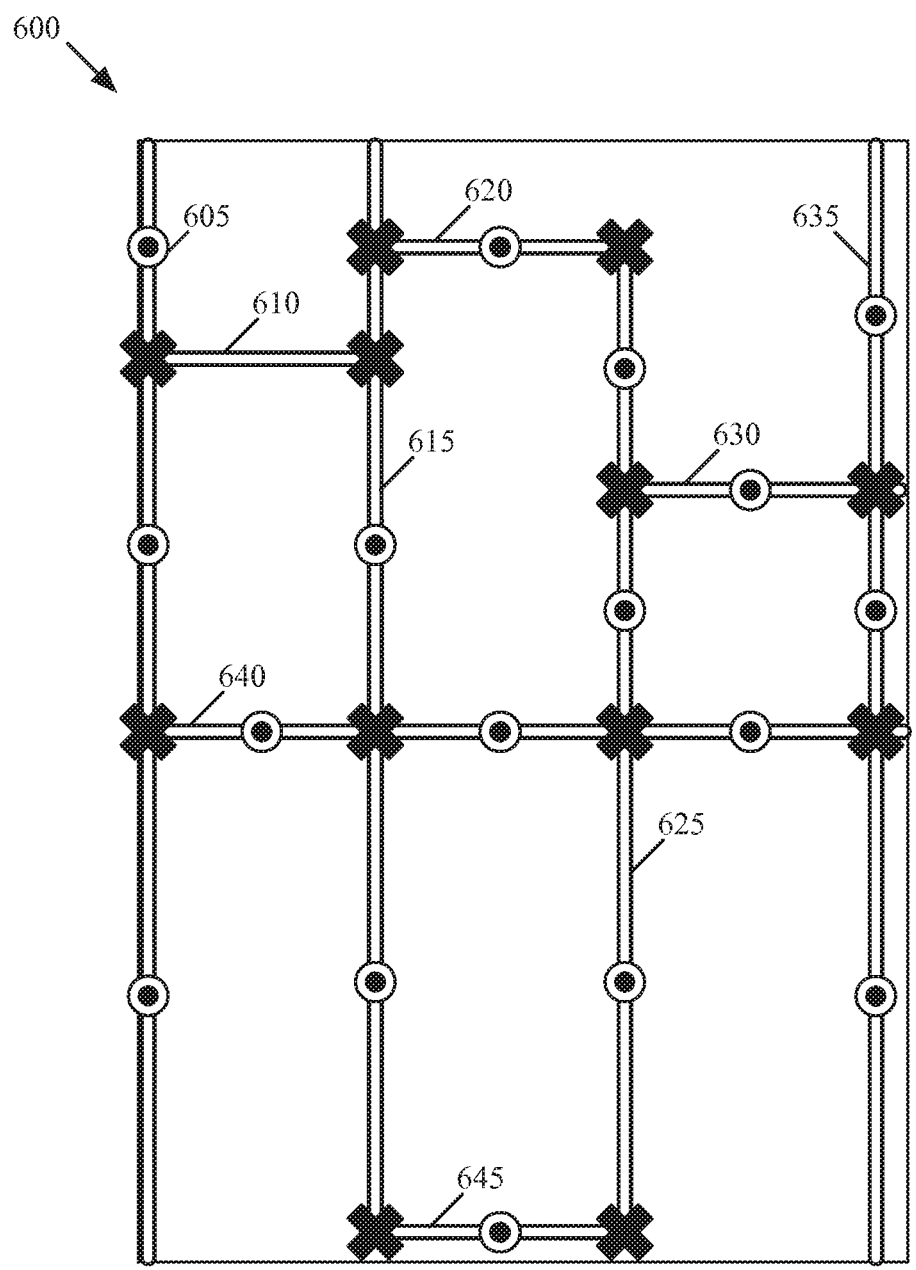
FIG. 6 conceptually illustrates a road network assembled from the map tiles illustrated in FIG. 5 according to some embodiments of the invention.

The process 400 will be described by reference to FIGS. 5 and 6. FIG. 5 conceptually illustrates map tiles 505-530 for a map according to some embodiments of the invention. FIG. 6 conceptually illustrates a road network 600 assembled from the map tiles illustrated in FIG. 5 according to some embodiments of the invention.

As shown, the process 400 begins by assembling (at 405) roads for a map in order to create a road network for the map. In some embodiments, the process 400 assembles the roads based on road data included in map tiles retrieved from a map service. To assemble the roads in the map, in some embodiments, the process 400 identifies road segments in the same and/or different map tiles that are specified as part of the same road and joins the identified road segments to form a single road segment. The process 400 of some embodiments identifies road segments as belonging to the same road based on attributes of the road segments (e.g., road names, road route numbers or shield names, etc.). In some embodiments the road segment attributes are stored as metadata in the corresponding map tiles. For instance, in some embodiments, the process 400 identifies road segments in map tiles as part of the same road when the road segments have the same name.

In some embodiments, a road is might be referred to by a name as well as a route number. For example, a highway might be referred to as "Santa Maria Highway" and highway "13", an expressway might be referred to as "Laurel Expressway" and route "17". etc. Alternatively to, or in conjunction with matching road names, the process 400 identifies road segments in different map tiles as part of the same road when the road segments have the same route number.

Referring to FIG. 5 as an example, the map tiles 505-530 are for assembling roads for a portion of a map. The assembled roads form a road network for the portion of the map. In this example, the map tiles 505-530 include road data that describe road segments 540-578 that are used to create the road network for the portion of the map. As shown, the map tile 505 includes the road segments 540-544, the map tile 510 includes the road segments 546-554, the map tile 515 includes the road segments 556-560, the map tile 520 includes the road segments 564-566, the map tile 525 includes the road segments 568-572, and the map tile 530 includes the road segments 574-578.

Continuing with the example, FIG. 6 illustrates the road network 600, which is assembled from the road segments 540-578 shown in FIG. 5. For this example, the road segments 540-578 in FIG. 5 were joined together in the same or similar manner described above by reference to operation 405 of FIG. 4 to form the road network 600.

As illustrated, the road segments 540, 556, and 568 were joined to form the road segment 605, the road segments 544, 560, and 570 were joined to form the road segment 615, the road segments 546 and 548 were joined to form the road segment 620, the road segments 550, 564, and 576 were joined to form the road segment 625, the road segments 554, 566, and 578 were joined to form the road segment 635, the road segments 558 and 562 were joined to form the road segment 640, and the road segments 572 and 574 were joined to form the road segment 645.

Once the process 400 joins the road segments to form a single road segment, the process 400 aggregates the attributes of the road segments (e.g., road name, road route number or shield name, a one-way road, a two-way road, styling for the road segments, etc.) and associates the single road segment with the aggregated attributes.

Next, the process 400 identifies (at 410) locations along roads in the road network at which not to place map labels. In some embodiments, the process 400 identifies such locations by iterating through each road segment in the road network and detecting junctions, intersections, and sharp bends along the road segment. The process 400 ignores these identified locations when performing 425, which is described below.

In some embodiments, a road is represented by an ordered chain of points and line segments that link each point to the next point, which forms a sequence of line segments. To identify sharp bends (at which not to place map labels) in a road represented in such a manner, the process 400 of some embodiments compares an angle formed by a pair of adjacent line segments in the road representation with a defined threshold angle (e.g., 10 degrees, 20 degrees, 35 degrees, etc.). if the angle formed by the pair of adjacent line segments passes the threshold angle, the process 400 determines that a sharp bend exists at the point between the pair of line segments and identifies the point as a location at which not to place map labels. In some embodiments, the process 400 analyzes every set of three consecutive points along the roads in the road network in order to identify sharp bends in the roads at which not to place map labels.

In some embodiments, the process 400 uses a different approach to identify sharp bends in a road that is represented by an ordered chain of points and line segments that link each point to the next point. When the total length of a pair of adjacent line segments is less than a defined threshold length, the process 400 of some embodiments identifies a short chain of consecutive line segments that includes the pair of adjacent line segments and has a total length that is greater than or equal to the threshold length.

The process 400 identifies sharp bends in such a chain of line segments comparing the defined threshold angle (or a different defined threshold angle) with an angle formed by a pair of line segments that each start at different ends of the chain and terminates at a common point at or near the middle of the chain of line segments. If the angle formed by the pair of line segments passes the threshold angle, the process 400 determines that a sharp bend exists at the point between the pair of line segments and identifies the point as a location at which not to place map labels. In some embodiments, the process 400 analyzes every set of three consecutive points along the roads in the road network in order to identify sharp bends in the roads at which not to place map labels.

As an example, FIG. 6 additionally illustrates positions along roads in the road network 600 at which not to place map labels, in this example, locations in the road network 600 that have intersecting roads are marked with Xs to indicate that map labels are not to be placed at these positions.

Returning to FIG. 4, the process 400 then determines (at 415) the styling of labels in the map. In some embodiments, the process 400 determines the styling of the map labels based on localization factors, such as language settings, time zone settings, etc., that indicate the locality of the device on which the mapping application is running. Alternatively, or in conjunction with the locality of the device, the process 400 of some embodiments determines the styling of the map labels based on a style sheet that specifies styling of the map labels. In some embodiments, the style sheet specifies styling according to the type of map element and/or map construct (e.g., a freeway, a suburban street, a city, a state, a continent, etc.) for which map labels are rendered, the type of device (e.g., a smartphone, a table computing device, a desktop computer, a laptop computer, etc.) for which the mapping application is operating, etc. The styling of the map labels specifies in some embodiments the type of font, the color, and the size of the characters to use for the different map labels.

Next, the process 400 determines (at 420) the size of map labels. The process 400 of some embodiments determines the size of map labels by determining the size of each character (e.g., the dimensions of each character in terms of pixels or pica) for strings in map labels and the size of the strings (e.g., the height, width, and/or length of the strings in terms of pixels or pica). In some embodiments, the process 400 uses a text system, such as a system level text code that provides the width of strings based on a specified font, size, and road classification e.g., highways, expressways, arterial roads, collector roads, back roads, etc.).

Finally, the process 400 identifies (at 425) candidate positions along roads in the road network for placing map labels. In some embodiments, when the process 400 identifies the candidate positions, the process 400 ignores the locations identified at 410. That is, the process 400 in some such embodiments does not consider locations along roads that have junctions, intersections, and/or sharp bends.

In some embodiments, the process 400 identifies candidate positions by analyzing every section of road in the road network that does not have any junctions, intersections, or sharp bends. For such a particular road section, the process 400 determines whether the particular road section is specified as a one-way road. If the particular road section is a one-way road and the length of the particular road section is shorter than a threshold length, the process 400 places a map label indicating that the particular road section is a one-way road (e.g., a one-way arrow). Otherwise, the process 400 places a map label indicating the road name or route number or shield name at the midpoint of the particular road section.

The process 400 continues to iteratively place map labels indicating the road name or route number or shield name at defined increments from the midpoint of the particular road section towards each end of the particular road section. When the length of the particular road section from a position at which a map label was last placed to the end of the particular road section closest to the position is shorter than a defined length, the process 400 stops placing map labels along the particular road section. In some embodiments, if the particular road section is specified as a one-way road, the process 400 places map labels indicating that the particular road section is a one-way road (e.g., a one-way arrow) between the map labels that were last placed and the end of the particular road section closest to the map labels.

Referring to FIG. 6 as an example, this figure also conceptually illustrates candidate positions along roads in the road network 600 for placing map labels. The candidate positions in this example are indicated by circles along roads in the road network 600. As shown, candidate positions are not placed at any of the positions identified at 610, which are indicated by Xs in FIG. 6.

II. Determining Layouts for Map Labels

As noted above, in some embodiments, when the mapping application determines a layout for map labels, the mapping application uses a virtual camera for identifying a position in a 3D map from which to render a view of the 3D map and selects positions at which to place labels based on candidate positions identified according to the techniques described in the previous Section I and the position and orientation of the virtual camera.

Figure 7:
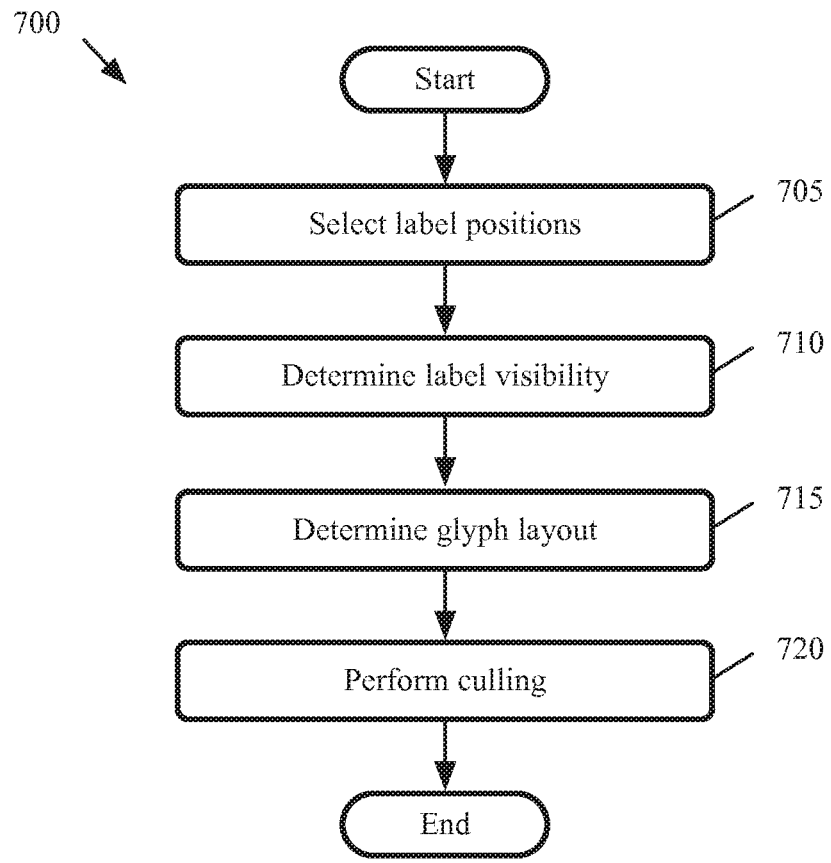
FIG. 7 conceptually illustrates a process of some embodiments for determining a layout for map labels in a 3D map.

FIG. 7 conceptually illustrates a process 700 of some embodiments for determining a layout for map labels in a 3D map. The mapping application described above and below by reference to FIGS. 1, 2, 19, 22, and 25 performs in some embodiments the process 700. in some embodiments, the mapping application performs the process 700 as part of operation 310 described above by reference to FIG. 3. FIG. 7 will be describe by reference to FIG. 8, which conceptually illustrates an example of glyph layout for a road name according to some embodiments of the invention.

As shown, the process 700 starts by selecting (at 705) label positions for map labels in the layout. In some embodiments, the process 700 selects the label positions from the candidate label positions identified at operation 425 described above by reference to FIG. 4. The process 700 of some embodiments selects the labels positions based on (1) the position and orientation of a virtual camera that identifies a position in a 3D map from which to render a view of the map and (2) the label size determined at operation 420 described above by reference to FIG. 4. For instance, the process 700 uses the position of the virtual camera to determine the zoom level (i.e., the distance from the virtual camera to the 3D map along the z-axis of the 3D map) and the determined label sizes of strings in map labels in some embodiments.

Next, the process 700 determines (at 710) visibility of map labels based on the position and orientation of the virtual camera. In some embodiments, the process 700 ignores map labels of map elements and/or map constructs with distances from the virtual camera that are not within a threshold range of distances since such map elements and/or map constructs are too far or close to be visible. The threshold range of distance is specified in a style sheet in some embodiments. In some embodiments, the style sheet specifies different types of map labels to be rendered for different ranges of zoom levels. For instance, the style sheet of some such embodiments might specify to render shield names for highways at one range of zoom levels, render road names for the highways at a second range of zoom levels, render road names for arterial roads at a third range of zoom levels, render road names for back roads at a fourth range of zoom levels, render city names for cities at a fifth range of zoom levels, etc.

Figure 8:
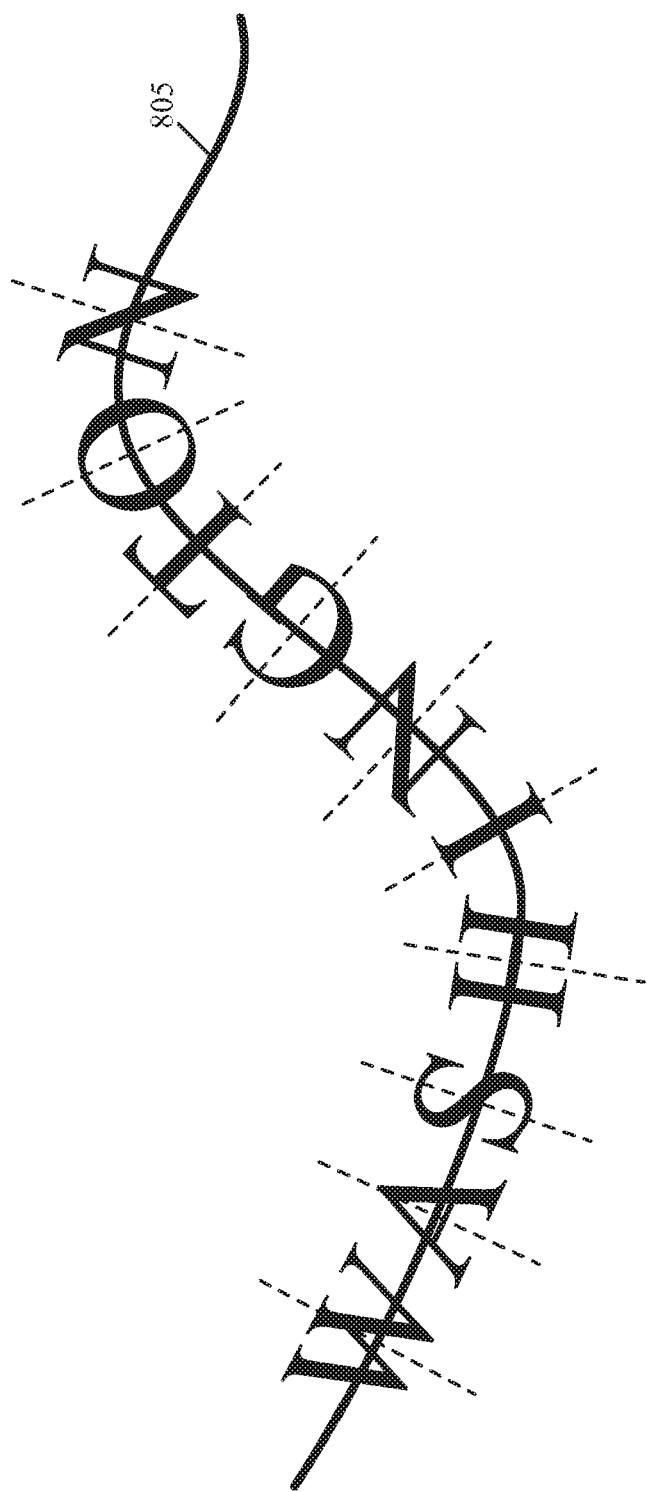
FIG. 8 conceptually illustrates an example of glyph layout for a road name according to some embodiments of the invention.

The process 700 then determines (at 715) glyph layouts for map labels that include strings. In some embodiments, the process 700 determines the glyph layouts by determining the location and manner in which to place each character of the strings. For instance, the process 700 of some embodiments places the glyphs for road names such that the road name follows the curvature of the road to which the road name is associated. Referring to FIG. 8 as an example, the road name "Washington" is shown following the curvature of a road 805. That is, each character of the road name "Washington" is placed along the road 805 so that a line that bisects the character is tangent to the road 805 at a point at which the line intersects the road 805. For other types of map labels, such as POI names, the process 700 lays the string in a horizontal orientation.

In some embodiments, the process 700 determines the shape for each character in a string of a map label based on a specified letterform. The letter forms for the characters are derived from texture atlases. In some embodiments, a texture atlas is an image that includes a collection of sub-images. Each sub-image corresponds to a letter rendered according to the specified letterform of the atlas. Instead of rendering the glyphs during the rendering of the map view, the process 700 of some embodiments renders the glyphs when determining the layout of the map labels in order to offload the expensive performance cost of rendering glyphs to this stage and, thus, increase the speed of rendering the map view when it is later rendered.

Finally, the process 700 performs (at 720) culling operations to prevent from being rendered map labels that may be partially visible or not visible at all and overlapping map labels. In some embodiments, the culling operations that the process 700 performs include detecting map labels that are colliding with each other and map labels that are occluded by map elements and/or map constructs in the map. Details of such operations are described below by reference to FIGS. 9-19. The process 730 of some embodiments also performs de-duping as part of the culling operations. In some embodiments, de-duping involves identifying map elements and/or map constructs that are specified to be labeled with only one map label. For instance, water ways, such as the English channel, are specified in some embodiments to be labeled with only one map label. In some such embodiments, the process 700 identifies water ways in the map and selects only one position along the water ways to render a map label.

A. Collision Detection

Figure 9:
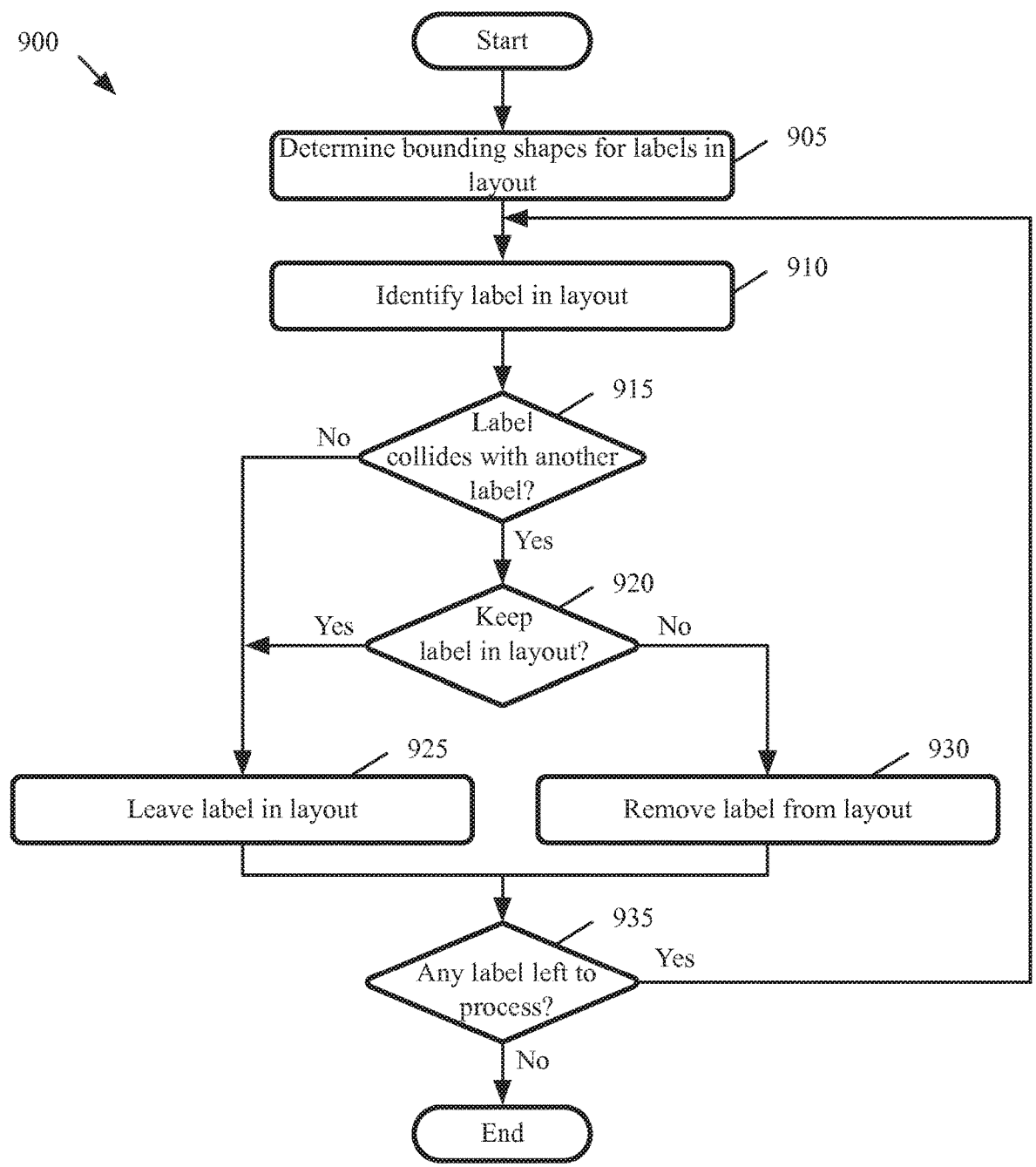
FIG. 9 conceptually illustrates a process of some embodiments for determining collisions between map labels.

FIG. 9 conceptually illustrates a process 900 of some embodiments for determining collisions between map labels. In some embodiments, the mapping application described above and below by reference to FIGS. 1, 2, 19, 22, and 25 performs the process 900. The mapping application of some embodiments performs the process 900 as part of operation 720 described above by reference to FIG. 7.

Figure 10:
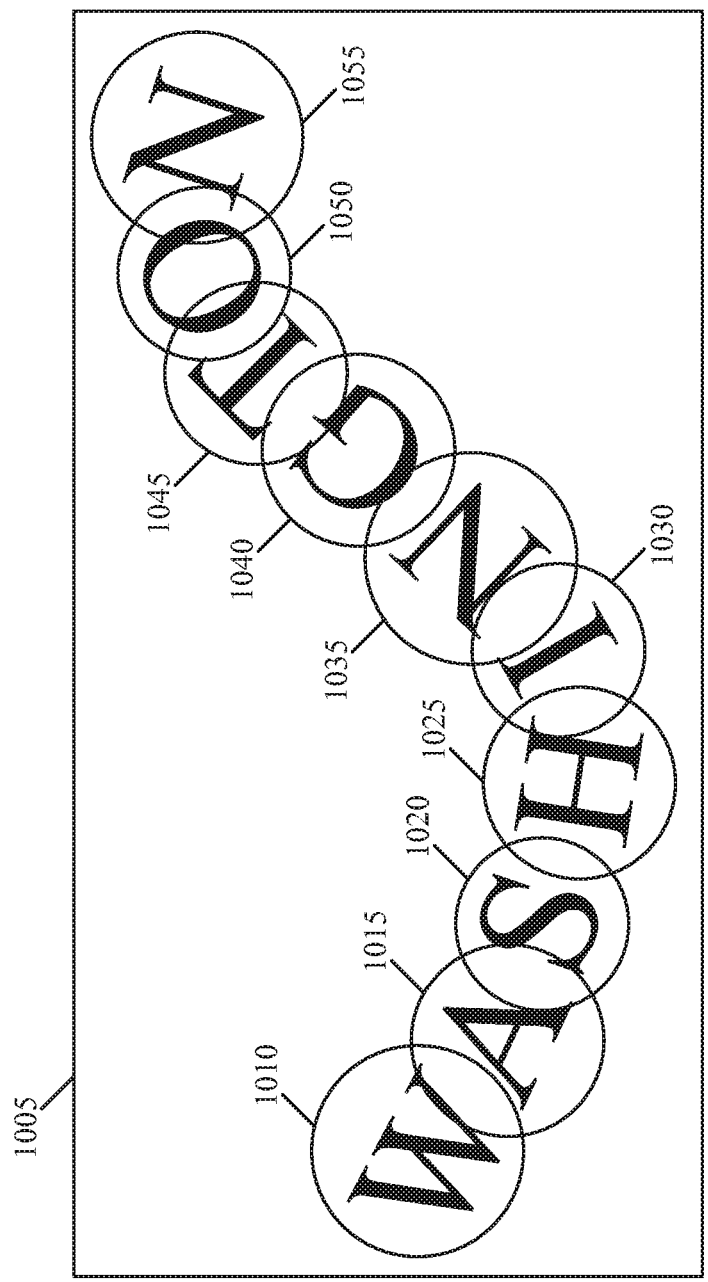
FIG. 10 conceptually illustrates an example of bounding shapes used for detecting collisions with the glyph layout illustrated in FIG. 8 according to some embodiments of the invention.
Figure 15:
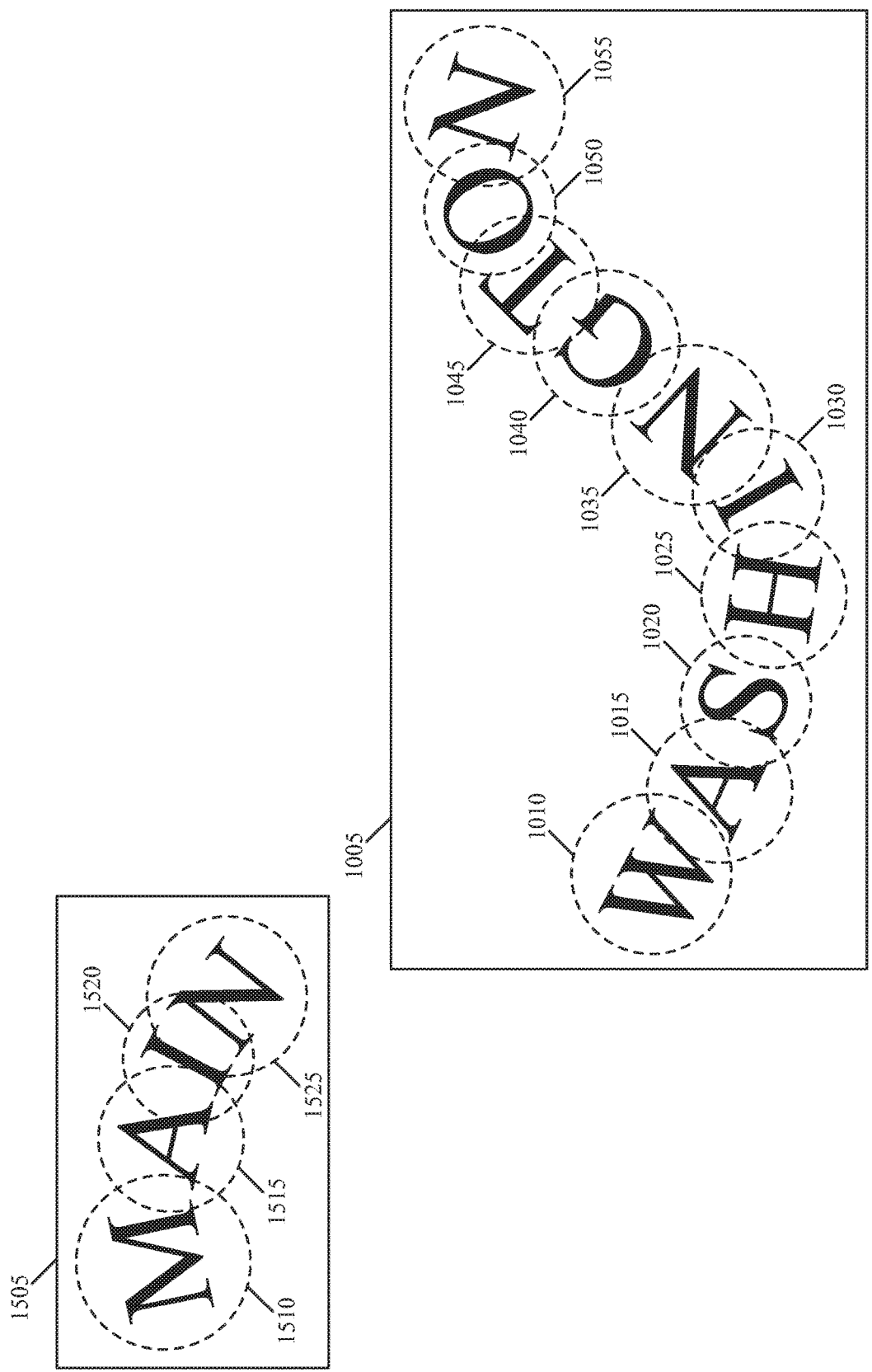
FIGS. 15-17 conceptually illustrate several examples of determining collisions based on the bound shapes illustrated in FIG. 10 according to some embodiments of the invention.
Figure 16:
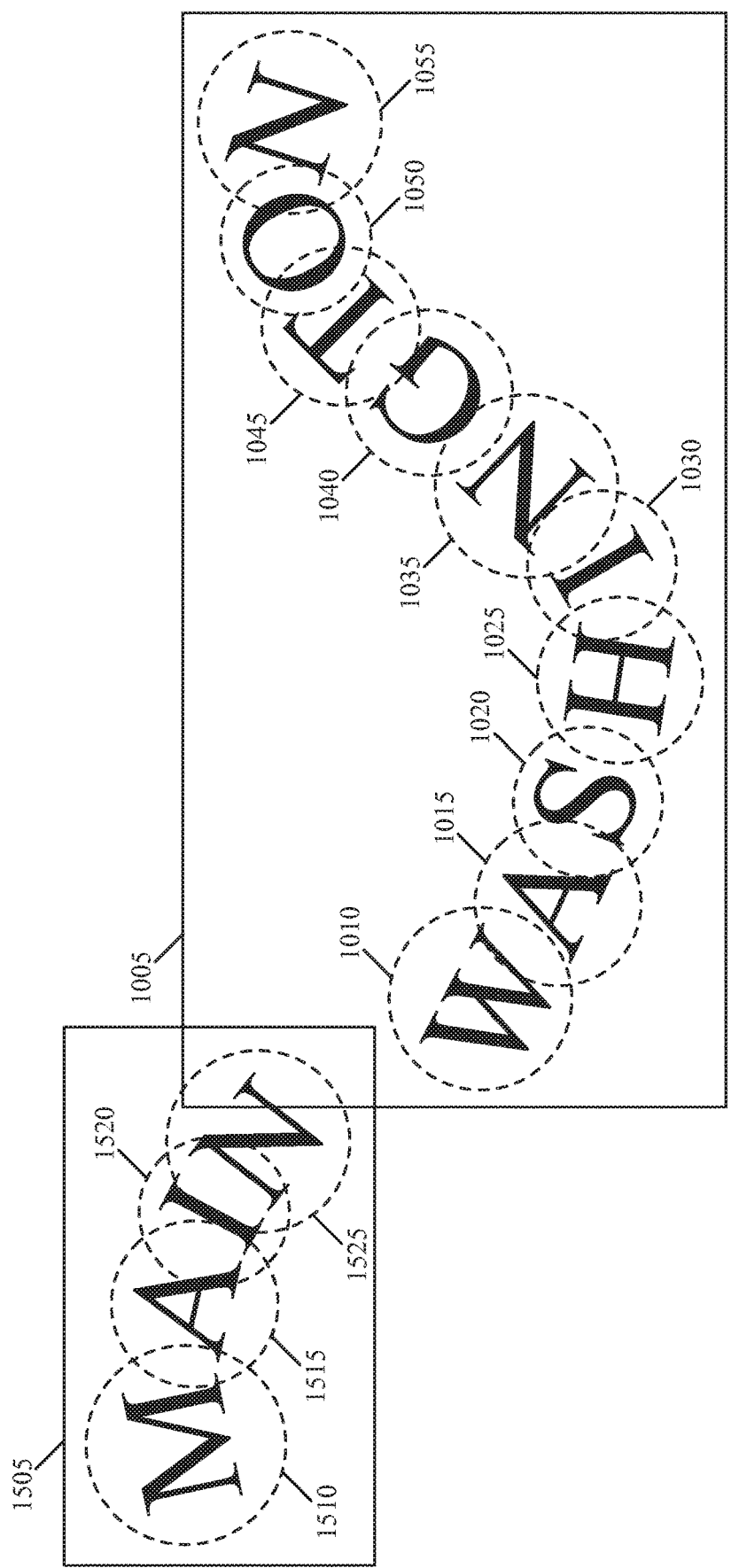
Figure 17:
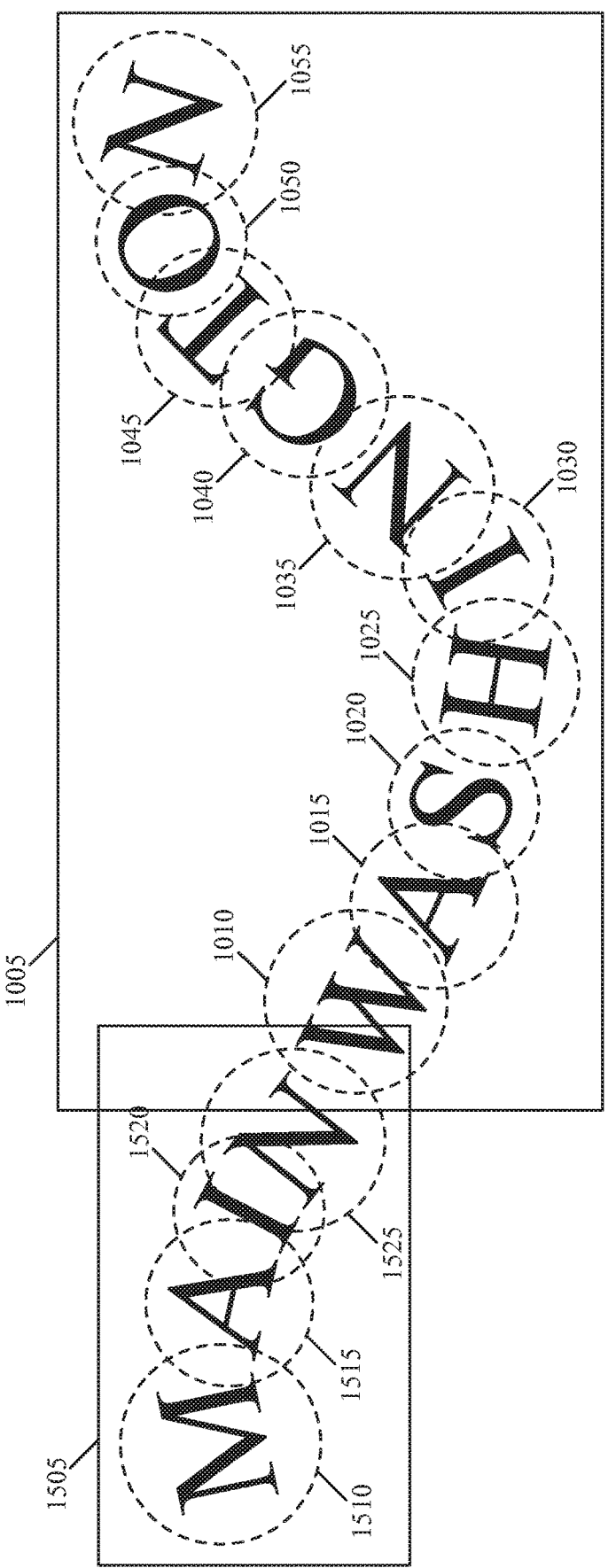

The process 900 will be described by reference to FIGS. 10-17. FIG. 10 conceptually illustrates an example of bounding shapes used for detecting collisions with the glyph layout illustrated in FIG. 8 according to some embodiments of the invention. FIGS. 11-14 conceptually illustrate bounding shapes for different types of map labels that are used for detecting collisions according to some embodiments of the invention. FIGS. 15-17 conceptually illustrate several examples of determining collisions based on the bound shapes illustrated in FIG. 10 according to some embodiments of the invention.

As shown, the process 900 begins by determining (at 905) bounding shapes for map labels in the layout of the map labels. Different embodiments used any number for different bounding shapes for detecting collisions with different map labels. For instance, the process 900 of some embodiments determines circular bounding shapes that encompass each character in a road name and a rectangular bounding shape that encompasses the entire string of the road name. As an example, FIG. 10 shows two different bounding shapes for detecting collisions with the glyphs (i.e., characters) in the glyph layout of the road name "Washington". As shown, circular bounding shapes 1010-1055 are used as bounding shapes that encompass each character in the string "Washington", In addition, a rectangular bounding shape 1005 is used as a bounding shape that encompasses the entire string of the road name.

Figure 11:
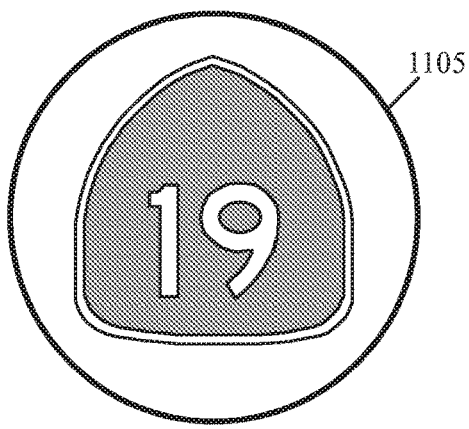
FIGS. 11-14 conceptually illustrate bounding shapes for different types of map labels that are used for detecting collisions according to some embodiments of the invention.
Figure 12:
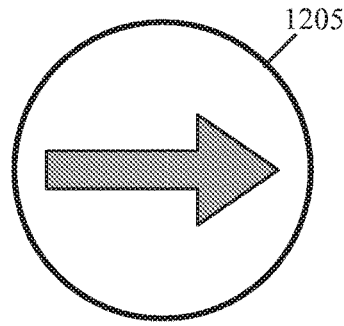

For other types of map labels, the process 900 of some embodiments determines different bounding shapes. For instance, the process 900 determines for route numbers or shield names of roads using a circular bounding shapes that encompasses the route number or shield name. FIG. 11 conceptually illustrates such a bounding shape 1105 for route number "19", The process 900 uses a similar bounding shape for map labels indicating that a road is a one-way road, such as a circular bounding shape 1305 for a map label of a one-way directional arrow illustrated in FIG. 12.

Figure 13:
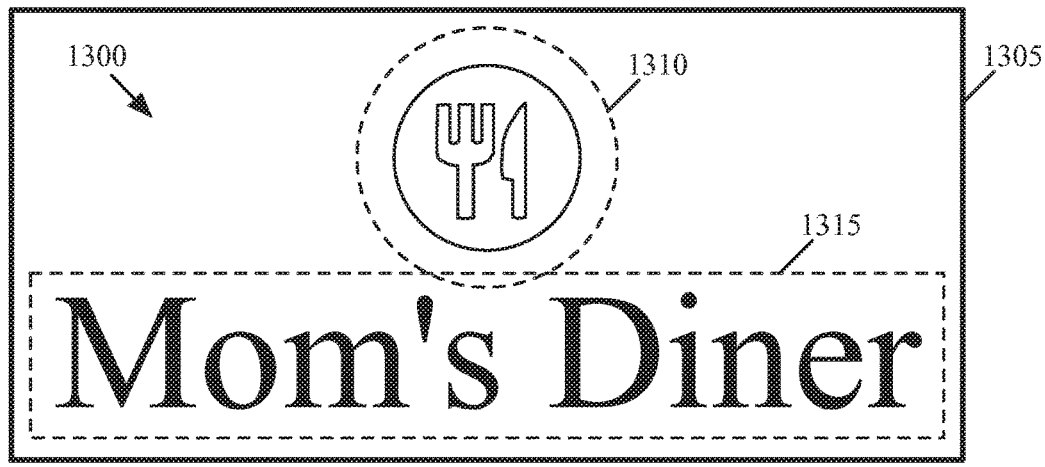
Figure 14:
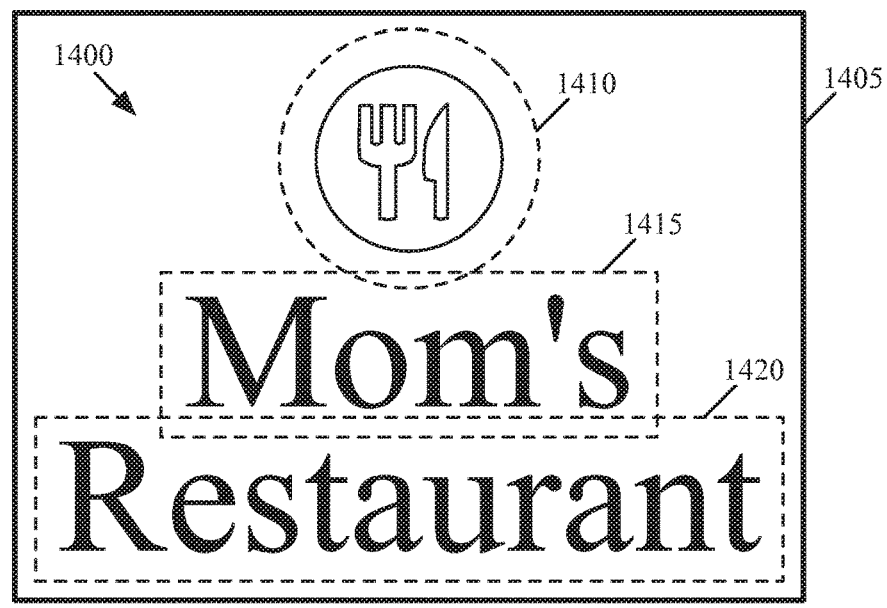

FIGS. 13 and 14 show examples of bounding shapes of different POI map labels 1300 and 1400 for which the process 400 of some embodiments determines for detecting collisions with the POI map labels 1300 and 1400. In particular, FIG. 13 illustrates a circular bounding shape 1310 that encompasses the POI map label 1300's POI indicator, a rectangular bound shape 1315 that encompasses the POI map label 1300's POI label, and a rectangular 1305 that encompasses the POI map label 1300.

In some embodiments, the POI label of a POI map label spans several horizontal lines. The process 900 of some such embodiments determines a bounding shape for the string at each horizontal line the POI label. Specifically, FIG. 14 illustrates a circular bounding shape 1410 that encompasses the POI map label 1400's POI indicator, a rectangular bound shape 1415 that encompasses the string on the top line of POI map label 1400's POI label, a rectangular bound shape 1420 that encompasses the string on the bottom line of POI map label 1400's POI label, and a rectangular 1405 that encompasses the POI map label 1400.

Once determining bounding shapes for map labels in the layout is completed, the process 900 then identifies (at 900) a map label in the layout of map labels. In some embodiments, the process 900 identifies a map label in the layout in a left-to-right manner. In other words, the process 900 scans the layout from left-to-right to identify a map label in the layout. The process 900 of some embodiments scans the layout in a top-to-bottom fashion to identify a map label in the layout. Still, in some embodiments, the process 900 uses a combination of scanning the layout left-to-right and top-to-bottom to identify a map label in the layout.

Next, the process 900 determines (at 915) whether the identified map label collides with another map label in the layout based on the bounding shape(s) determines for the identified map label. For road names with hounding shapes determined in the manner illustrated in FIG. 10, the process 900 of some embodiments uses the rectangular bounding shape that encompasses the entire string of the road name for a course, first level collision detection analysis. That is, the process 900 determines whether the bounding shapes of any other map label in the layout touches or intersects with the rectangular bounding shape that encompasses the entire string of the road name. If no collision is detected, the process 900 determines that the identified map label does not collide with any map labels in the layout.

If a collision is detected in the course, first level collision detection analysis, the process 900 of some embodiments uses the circular bounding shapes that encompasses the characters in the string of the road name for a finer, second level collision detection analysis. If the process 900 determines that the bounding shape of a map label in the layout touches or intersects with any of the circular bounding shapes that encompass the characters of the road name, the process 900 determines that the identified map label collides with another map label in the layout. Otherwise, the process 900 determines that the identified map label does not collide with any other map label in the layout even though a collision was detected in the course, first level collision detection analysis.

FIGS. 15-17 conceptually illustrate several examples of determining collisions based on the bound shapes illustrated in FIG. 10 according to some embodiments of the invention. Specifically, FIG. 15 illustrates an example of a collision not detected in the course, first level collision detection analysis. As shown in FIG. 15, a road name "Main" has circular bounding shapes 1510-1525 that encompass the characters of the string "Main" and a rectangular bounding shape 1505 that encompasses the entire string of the road name. In this example, the rectangular bounding shape 1005 of the road name "Washington" does not touch nor intersect with the rectangular bounding shape 1505 of the road name "Main". Accordingly, the process 900 determines in this example that the road name "Washington" does not collide with the road name "Main.

FIG. 16 illustrates an example of a collision detected in the course, first level collision detection analysis, but a collision not detected in the finer, second level collision detection analysis. As illustrated, the rectangular bounding shape 1005 of the road name "Washington" intersects with the rectangular bounding shape 1505 of the road name "Main". However, none of the circular bounding shapes 1010-1055 that encompass the characters of the road name "Washington" touch nor intersect any of the circular bounding shapes 1510-1525 that encompass the characters of the road name "Main". Therefore, the process 900 determines for this example the road name "Washington" does not collide with the road name "Main.

FIG. 17 illustrates an example of a collision detected in the course, first level collision detection analysis and in the finer, second level collision detection analysis. As illustrated in FIG. 17, the rectangular bounding shape 1005 of the road name "Washington" intersects with the rectangular bounding shape 1505 of the road name "Main". Additionally, the circular bounding shapes 1010 that encompasses the character "W" in the road name "Washington" intersects with the circular bounding shapes 1525 that encompass the character "N" in the road name "Main". As such, the process 900 in this example determines that the road name "Washington" collides with the road name "Main.

In some embodiments, the mapping application renders a portion of a map label when the portion of the map label does not collide with another map label. As described above by reference to FIG. 2, a POI map label in some embodiments includes (1) a POI indicator for indicating the location of the POI and (2) a POI label that indicates the name of the POI. When the POI label collides with another map label, some such embodiments still render the POI indicator if the POI indicator does not collide with any map labels.

Referring to FIG. 13 as an example, the process 900 of some embodiments keeps only the POI indicator in the layout of map labels when the process 900 determines that the rectangular bounding shape 1305 of the POI map label touches or intersects with the bounding shape of a map label in the layout, determines that the rectangular bounding shape 1315 touches or intersects with the bounding shape of a map label in the layout, and that the circular bounding shape 1310 does not touch not intersect with the bounding shapes of any other map labels in the layout.

Returning to FIG. 9, when the process 900 determines that the identified map label does not collide with any map label in the layout, the process 900 leaves (at 925) the identified map label in the layout and continues to 935. When the process 900 determines that the identified map label collides with another map label in the layout, the process 900 determines (at 920) whether to keep the identified map label in the layout.

As mentioned above, some embodiments selects a map label from a set of overlapping map labels to render based on a style sheet that specifies a map label to be rendered from a set of colliding map labels. Different embodiments use different criteria to specify the map label to be rendered from the set of colliding map labels. For example, in some embodiments, the style sheet specifies the map label to be rendered based on the type of map labels (e.g., road labels arc to be rendered when road labels collide with POI labels and/or POI indicators, city labels are to be rendered when city labels collide with road labels, state labels are to be rendered when state labels collide with city labels, etc.) selected when in the set of colliding map labels. Alternatively, or in conjunction, the style sheet of some embodiments specifies the same or similar type of map labels according to a defined hierarchy. For instance, when road labels collide, the style sheet of some such embodiments specifies to select highways, then expressways, then arterial roads, then collector roads, then back roads, etc. When map label at the same level of the defined hierarchy collide (e.g., highway road labels colliding, expressway road labels colliding, arterial road labels colliding, collector road labels colliding, back road labels colliding, etc.) the mapping application of some embodiments randomly selects a map label to be rendered.

If the process 900 determines to keep the map label in the layout, the process 900 leaves (at 925) the map label in the layout and proceeds to 935. In some embodiments, the process 900 also removes from the layout the map label with which the identified map label was determined to collide. If the process 900 determines to not keep the map label in the layout, the process 900 removes (at 930) the map label from the layout and continues to 935.

Finally, the process 900 determines (at 935) whether any map label in the layout is left to process. In some embodiments, the process 900 uses the techniques described above to scan the layout for any map label left to process. When the process 900 determines that a map label in the layout is left to process, the process 900 returns to 910 to continue processing any remaining map labels in the layout. Otherwise, the process 900 ends.

B. Occlusion Detection

Figure 18:
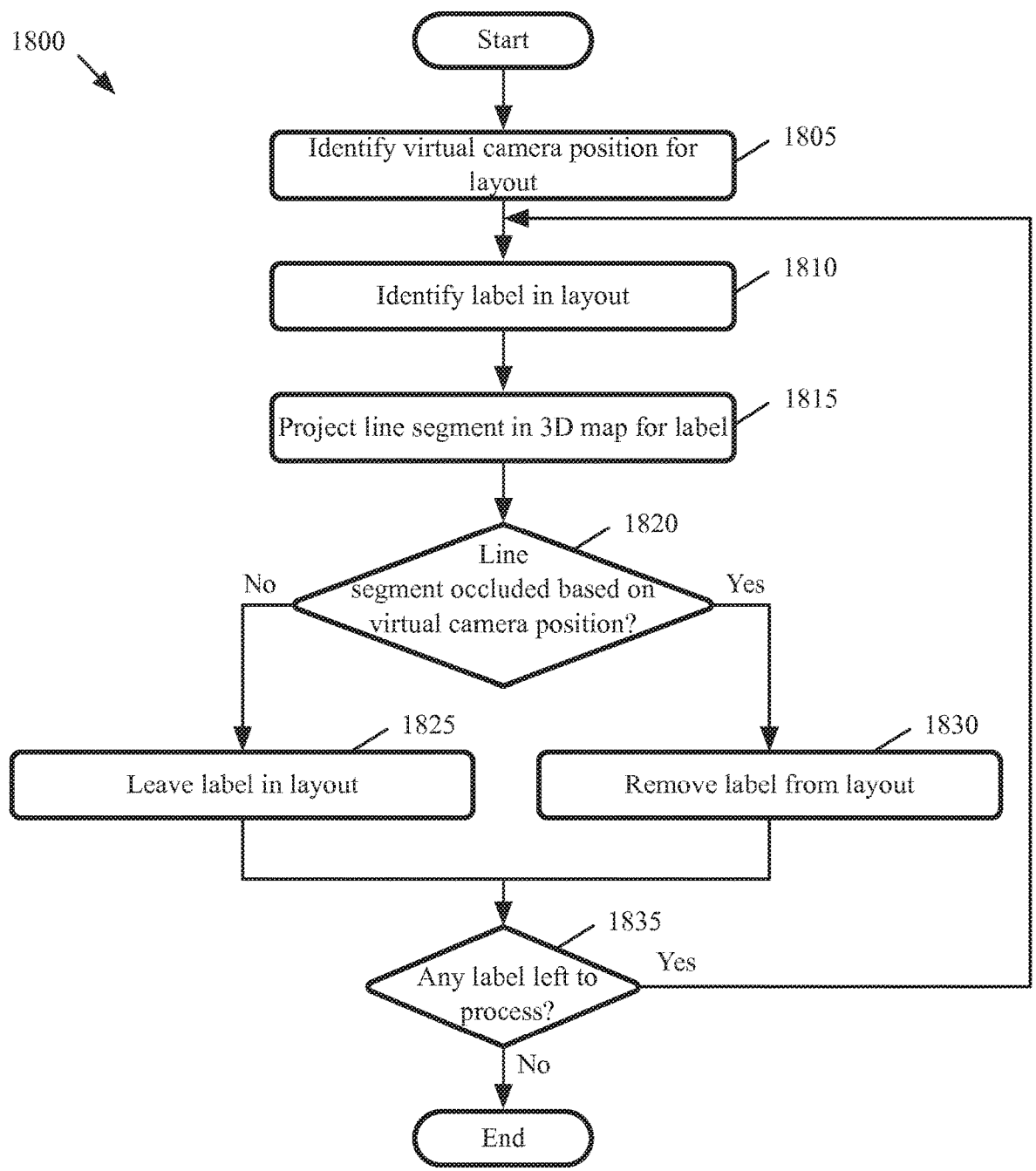
FIG. 18 conceptually illustrates a process of some embodiments for determining that map labels are occluded.

FIG. 18 conceptually illustrates a process 1800 of some embodiments for determining map labels that are occluded. The mapping application of some embodiments described above and below by reference to FIGS. 1, 2, 19, and 22 performs the process 1800 when rendering views of a map from a 3D perspective. In some embodiment, the mapping application performs the process 1800 as part of operation 720 described above by reference to FIG. 7. The process 1800 will be described by reference to FIG. 19, which conceptually illustrates examples of occluded map labels in a map view of a 3D map.

As shown, the process 1800 starts by identifying (at 1805) a virtual camera position for the layout of map labels. As noted above, in some embodiments, a virtual camera is a conceptualization of the position in the 3D map from which the mapping application renders a map view of the 3D map. In some embodiments, the process 1800 identifies the virtual camera position by identifying the position and orientation of the virtual camera with respect to the 3D map.

Next, the process 1800 identifies (at 1810) a map label in the layout of map labels. The process 1800 of some embodiments identifies a map label in the layout in a left-to-right manner. That is, in some such embodiments, the process 1800 scans the layout from left-to-right to identify a map label in the layout. In some embodiments, the process 1800 scans the layout in a top-to-bottom fashion to identify a map label in the layout. Still, the process 1800 of some embodiments uses a combination of scanning the layout left-to-right and top-to-bottom to identify a map label in the layout.

The process 1800 then projects (at 1815) a line segment in the 3D map for the map label. In some embodiments, the process 1800 projects the line segment in the 3D map from the center of the map label and up along the z-axis of the 3D map, Different embodiments project line segments with different lengths. In some embodiments, the process 1800 projects line segment having a particular length based on a defined length specified in a style sheet.

Next, the process 1800 determines (at 1820) whether the line segment is occluded based on the identified virtual camera position. In some embodiments, the process 1800 determines that the line segment is occluded when the entire line segment is occluded. In some embodiments, the process 1800 determines that the line segment is occluded when the portion of the line segment that is occluded passes a defined percentage (e.g., 80 percent of the line segment, 90 percent of the line segment, 95 percent of the line segment, etc.) of the entire line segment.

As an example, FIG. 19 conceptually illustrates a portion of a 3D map 1900 at two stages 1905 and 1910 that show map labels occluded when the map is viewed from a 3D perspective. The first stage 1905 illustrates a view of the portion of the 3D map 1900. Here, the portion of the 3D map 1900 is viewed from a top-down perspective. As shown, the map view includes several roads, two road labels indicating the names of the corresponding roads, three buildings, and two POIs indicated by two POI map labels.

The second stage 1910 illustrates the GUI 1900 displaying a view of the map similar to the portion of the map illustrated in the first stage 1905 except the view of the map in the second stage 1910 is from a 3D perspective. The second stage 1910 also shows line segments 1915-1930 that are vertically projected in the 3D map. As shown, the line segment 1915 is vertically projected from the center of the POI indicator for "Jane's Bakery", the line segment 1920 is vertically projected from the center of the road label "Central Ave", the line segment 1925 is vertically projected from the center of the road label "Grand Blvd", and the line segment 1930 is vertically projected from the center of the POI indicator for "Mike's Pizza".

in this example, the line segments 1915 and 1920 are not occluded by any map elements and/or map constructs from the view of the map illustrated in the second stage 1910. Therefore, the process 1800 in some embodiments leaves the POI map label for "Jane's Bakery" and the road label "Central Ave" in the layout of map labels for rendering. The line segments 1925 and 1930 are completely occluded by a building from the view of the map illustrated in the second stage 1910. Thus, the process 1800 of some embodiments removes the POI map label for "Mike's Pizza" and the road label "Grand Blvd" from the layout of map labels and are not rendered, as indicated by a greying out of the POI label for "Mike's Pizza" and the road label "Grand Blvd".

Returning to FIG. 18, when the process 11800 determines that the line segment not is occluded, the process 1800 leaves (at 1825) the map label in the layout and continues to 1835. If the process 1800 determines that the line segment is occluded, the process 1800 removes (at 1830) the map label from the layout.

Finally, the process 1800 determines (at 1835) whether any map label in the layout is left to process. In some embodiments, the process 1800 uses the techniques described above to scan the layout for any map label left to process. When the process 1800 determines that a map label in the layout is left to process, the process 1800 returns to 1810 to continue processing any remaining map labels in the layout. Otherwise, the process 1800 ends.

C. Road Labels on Slopes

As explained above, the mapping application of some embodiments determines the layout of the characters of road labels so that the road label follows the curvature of the road to which the road name is associated. In some embodiments, a road in a 3D map may also slope up or down and in some instances undulate up and down. The mapping application of some embodiments determines the layout of the characters of a road label such that the road label follows the slope and/or undulation of the road to which the map label is associated.

Figure 20:
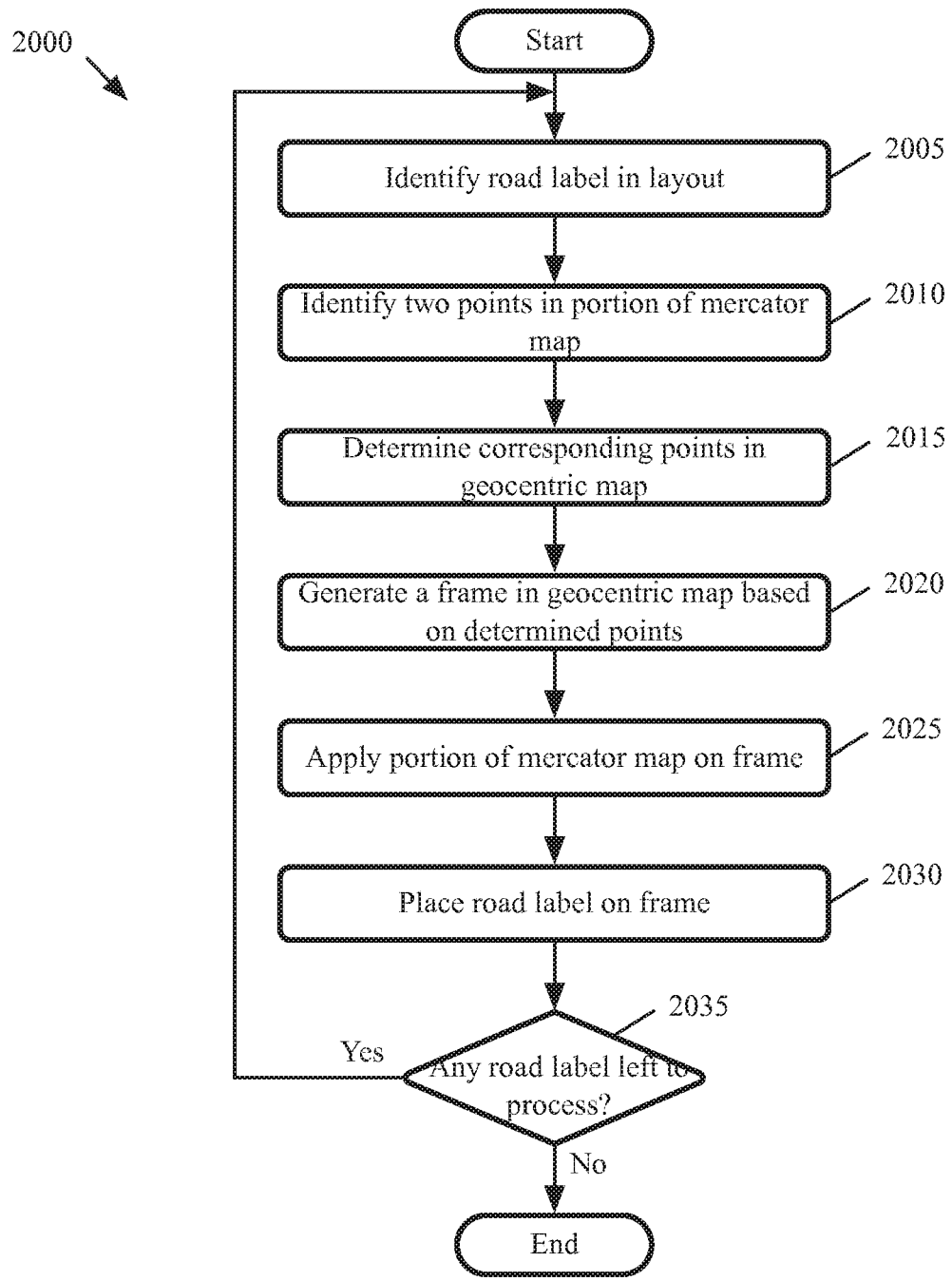
FIG. 20 conceptually illustrates a process for determining the layout of road labels to follow the slope of the roads to which the road labels are associated.
Figure 22:
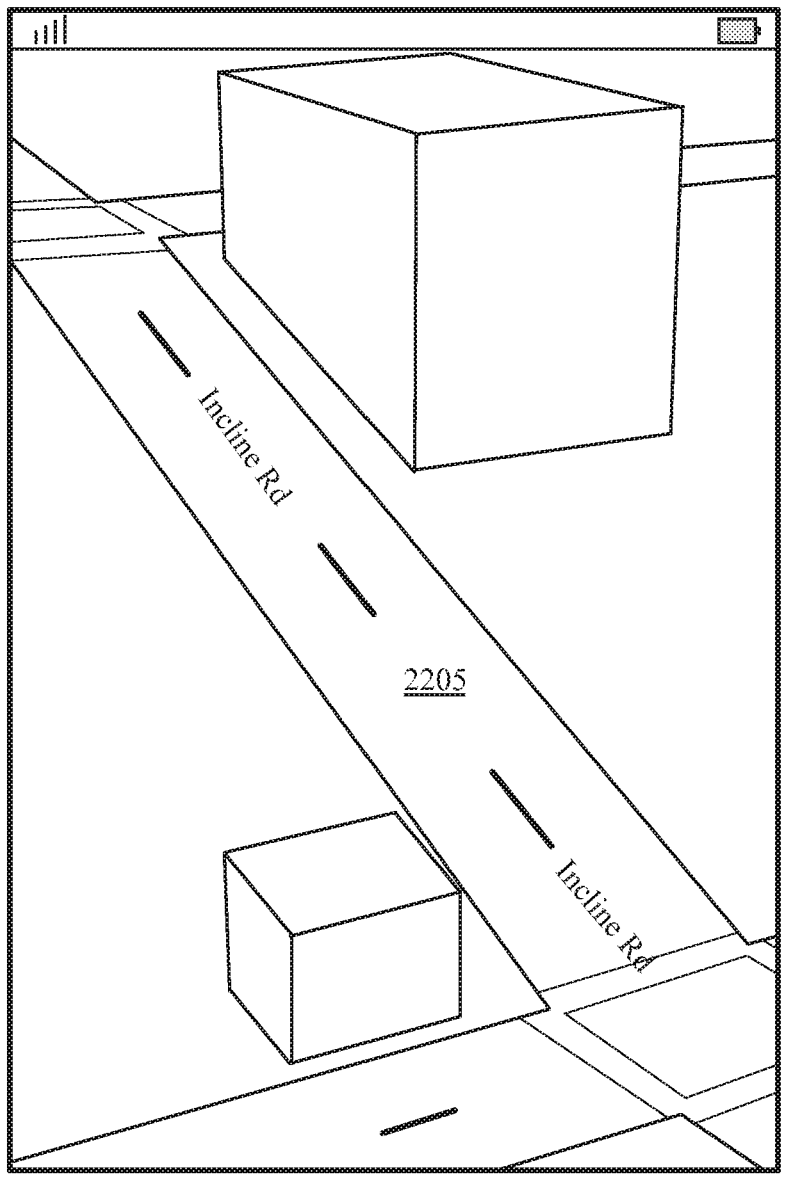
FIG. 22 conceptually illustrates an example of a road label placed on a slope of a road according to some embodiments of the invention.

FIG. 20 conceptually illustrates a process 2000 for determining the layout of road labels to follow the slope of the roads to which the road labels are associated. In some embodiments, the mapping application described above and below by reference to FIGS. 1, 2, 19, 22, and 25 performs the process 2000 when determining the glyph layouts of road labels. The mapping application of some embodiments performs the process 2000 as part of operation 715 described above by reference to FIG. 7. The process 2000 will be described by reference to FIGS. 21 and 22. FIG. 21 conceptually illustrates an example determining a slope of a road on which to place of a road label. FIG. 22 conceptually illustrates an example of a road label placed on a slope of a road according to some embodiments of the invention.

As shown, the process 2000 begins by identifying (at 2005) a road label in the layout of map labels. The process 2000 of some embodiments identifies a road label in the layout by scanning the layout from left-to-right while the process 2000 of other embodiments identifies a road label in the layout by scanning the layout from top-to-bottom. Still, in some embodiments, the process 2000 uses a combination of scanning the layout left-to-right and top-to-bottom to identify a road label in the layout.

Next, the process 2000 identifies (at 2010) two points in a portion of a Mercator map. In some embodiments, the two points are (1) a point along a road at which the first character of the road label is placed and (2) another point along the road at which the last character of the road label is placed. Referring to FIG. 21 as an example, the left side of FIG. 21 shows a two points pA and pB on a portion of a Mercator map 2100. In this example, the points correspond to a first point along a road 2105 at which the first character of a road label (not shown in this figure) is placed and a second point along the road at which the last character of the road label is placed.

The process 2000 then determines (at 2015) corresponding points in a geocentric map. In some embodiments, the geocentric map is a map of the Earth that is described with respect to the center of the Earth. For instance, in some embodiments, a particular point in the geocentric map corresponds to a point on the surface of the Earth and has coordinates that are described with respect to the center of the Earth. Continuing with the example in FIG. 21, the right side of FIG. 21 illustrates two points pA' and pB' in a portion of a geocentric map 2110 that corresponds to the points pA and pB in the portion of the Mercator map 2100.

After determining points in the geocentric map, the process 2000 generates (at 2020) a frame in the geocentric map based on the determined points in the geocentric map, In some embodiments, the generated frame is a plane that includes the determined points in the geocentric map. That is, the generated frame is a plane in which the determined points are coplanar. Continuing with the example in FIG. 21, the right side of FIG. 21 illustrates a frame 2115 generated based on the two points pA' and pB' in a portion of the geocentric map 2110, In addition, the right side of FIG. 21 shows vectors vUp, vA, vB, and vC, The vector vUp is collinear with a vector that starts from the center of the Earth (not shown in this figure) and passes through the point pA', The vector vA is a vector that starts from the point pA' and passes through the point pB'. The vector vB is a cross product of the vectors vUp and vA. The vector vC is the cross product of the vectors vA and vB. To generate the frame 2115, the process 2000 of some embodiments determines a plane that is perpendicular to the vector vC and generates a two-dimensional rectangular shape along the determined plane.

Returning to FIG. 20, the process 2000 then applies (at 2025) the portion of the Mercator map on the generated frame. In some embodiments, the process 2000 applies the portion of the Mercator map on the generated frame by mapping the road in the portion of the Mercator map associated with the map label to the generated frame in the geocentric map. Continuing with the example in FIG. 21, the right side of FIG. 21 shows a road 2120 on the frame 2115. For this example, the road 2120 is the road 2105 after it has been translated to the portion of the geocentric map 2110.

Next, the process 2000 places (at 2030) the identified road label on the frame. The process 2000 of some embodiments places the road label on the frame in the same or similar manner that described above by reference to FIG. 7. In particular, in some embodiments, the process 2000 places the characters of the road label such that the road label follows the curvature of the road to which the road name is associated. In other words, each character of the road label is placed along the road so that a line that bisects the character is tangent to the road at the point at which the line intersects the road. As an example, FIG. 22 conceptually illustrates a road label placed on a slope of a road. Specifically, FIG. 22 shows a rendered view of a 3D map. As shown, the view of the 3D map includes a road 2205 the slopes up and towards the right and a road label "Incline Rd" that is placed along the slop of the road. In some embodiments, the mapping application renders the view of the 3D map, renders the road label using the technique described above, and superimposes the road label over the map view of the 3D map.

Finally, the process 2000 determines (at 2035) whether any map label in the layout is left to process. In some embodiments, the process 2000 uses the techniques described above to scan the layout for any map label left to process. When the process 2000 determines that a map label in the layout is left to process, the process 2000 returns to 2005s to continue processing any remaining map labels in the layout. Otherwise, the process 2000 ends.

III. Rendering Map labels

Figure 23:
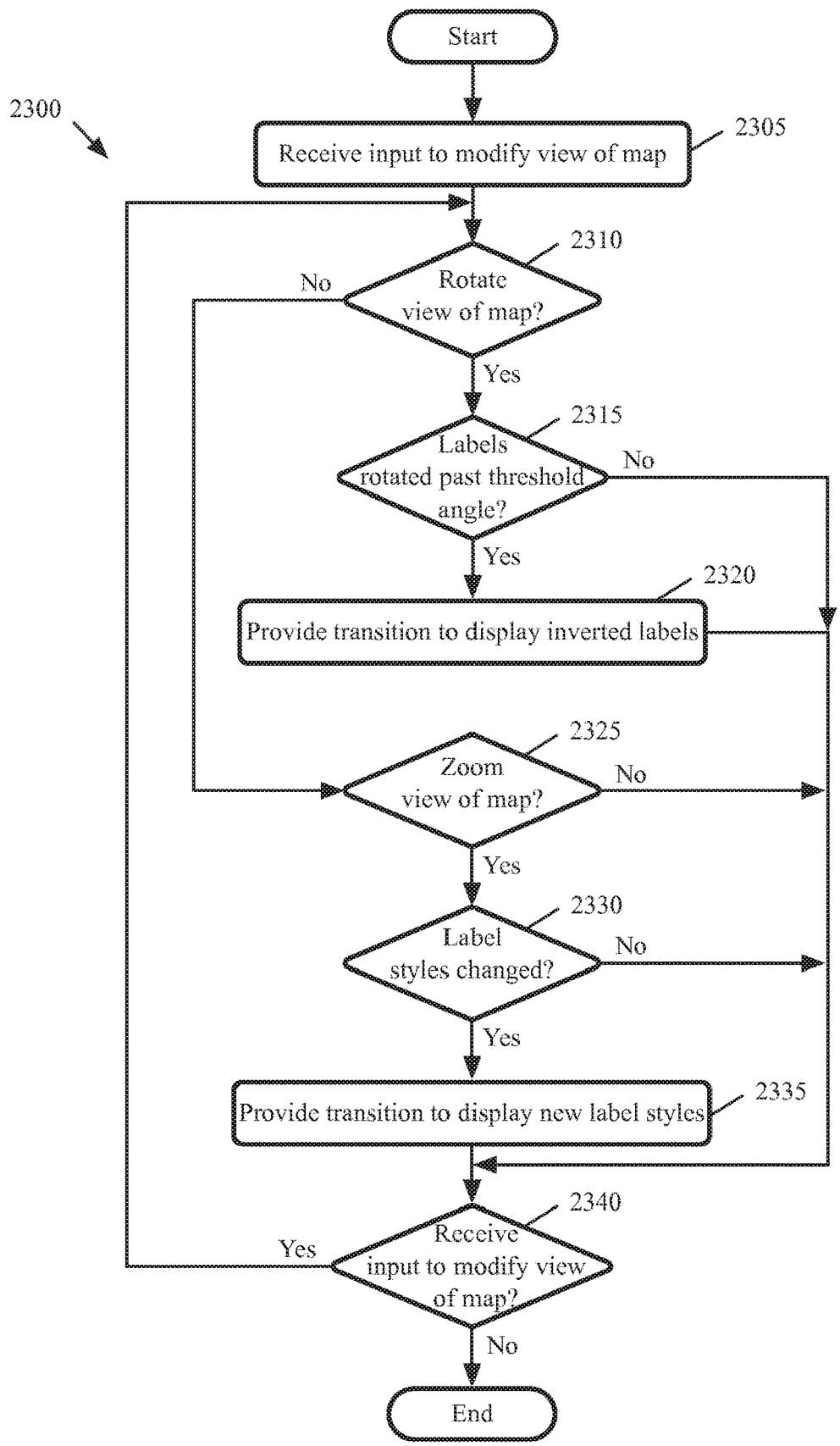
FIG. 23 conceptually illustrates a process of some embodiments for rendering map labels for a map view.

In some embodiments, once the mapping application processes roads and determines a layout of map labels, the mapping application renders a view of the map and map labels for map elements and/or constructs in the map view. FIG. 23 conceptually illustrates a process 2300 of some embodiments for rendering map labels for a map view. The mapping application of some embodiments described above and below by reference to FIGS. 1, 2, 19, 22, and 25 performs the process 2300. In some embodiments, the mapping application performs the process 2300 as part of operation 315 described above by reference to FIG. 3.

As shown, the process 2300 starts by generating (at 2305) label meshes for map labels. In sonic embodiments, the process 2300 generate a mesh (e.g., by creating a data structure that stores data describing the mesh) for each map label that is to be rendered.

Next, the process 2300 loads (at 2310) the glyphs for the map labels. As described above by reference to FIG. 7, some embodiments determines the shape for each character in a string of a map label based on a specified letterform that is derived from a texture atlas for the specified letterform. The texture atlas of some embodiments is pre-rendered and includes a collection of sub-images that correspond to different letters of the letterform. For each glyph character) in a particular map label, the process 2300 loads the corresponding sub-image.

The process 2300 then applies (at 2315) animation for the map view. In some embodiments, the process 2300 provides animations for any number of different to animate transitions between displaying different map labels. For instance, the process 2300 of some embodiments provides animations that include fading map labels in and/or out when zoom or pan operations are performed on the map, cross fading upside down map labels with right side up versions of the map labels when rotate operations are performed, fading map labels in and/or out when colliding map labels are detected, cross fading different styles of map labels when the styling of map labels change (e.g., in response to zooming into and out from the map), etc.

Finally, the process 2300 draws (at 2320) the view of the map for display on a device on which the mapping application of some embodiments is operating and then the process 2300 ends. In some embodiments, the process 2300 draws the view of the map based on a virtual camera that is used to identify a position and orientation from which to render the view of the map. Different embodiments of the process 2300 render different types of map labels using different techniques. For instance, the process 2300 of some embodiments renders map views by superimposing 2D map labels (e.g., road labels, POI labels, POI labels, etc.) over rendered map views of the map. That is, in some such embodiments, the process 2300 renders a map view of the map and then adds 2D map labels to the rendered map view by overlaying the 2D map labels onto the map view.

For 3D maps, the process 2300 in some embodiments adds polygons that represent map labels (e.g., road path indicators) to the 3D map and renders map views of the 3D map with the added polygons. In other words, in some such embodiments, the process 2300 adds map labels to the 3D map before the process 2300 renders map views of the 3D map. In some embodiments, the map labels are part of the 3D map (as opposed to adding the map labels to the 3D map) and the process 2300 renders the map labels that are to be displayed in the map view. For map labels that are not to be rendered in the map view, the process 2300 of some such embodiments ignores such map labels that the process 2300 rendering in the map view of the 3D map.

Figure 24:
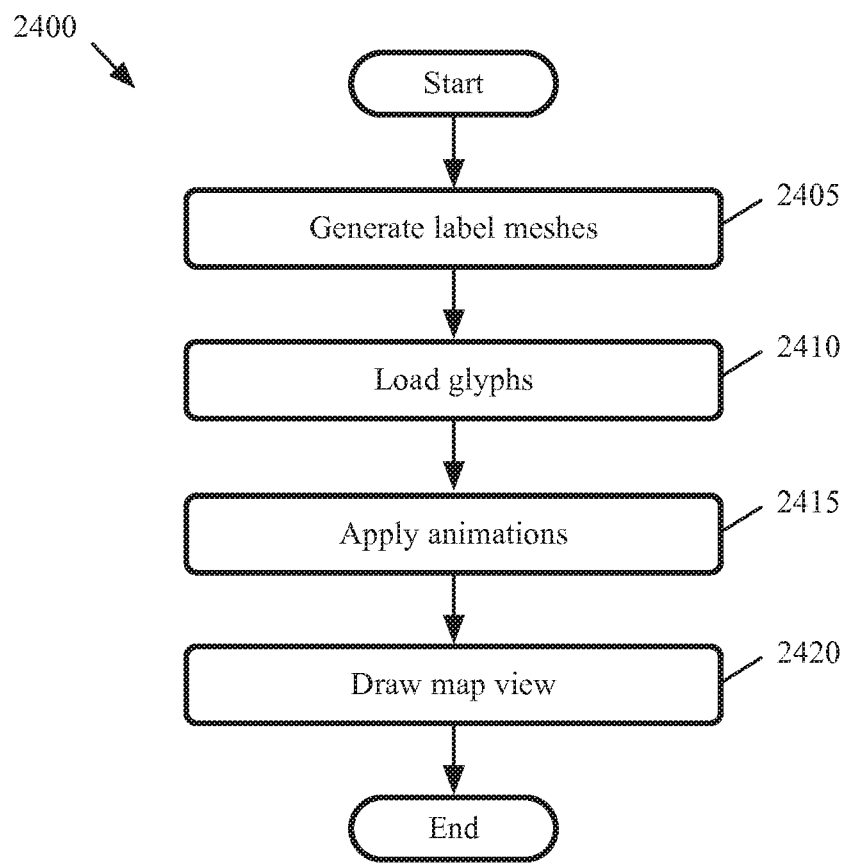
FIG. 24 conceptually illustrates a process of some embodiments for rendering map labels based on different adjustments to a view of a map.

FIG. 24 conceptually illustrates a process 2400 of some embodiments for rendering map labels based on different adjustments to a view of a map. In some embodiments, the mapping application described above and below by reference to FIGS. 1, 2, 19, 22, and 25 performs the process 2400 when the mapping application is in a hybrid-viewing mode or a standard-viewing mode and a user provides input to modify the view of the map.

The process 2400 begins by receiving (at 2405) input to modify the view of the map. In some embodiments, any number of different inputs modifies the view of the map. Examples of inputs include touch input, multi-touch input, gesture input, cursor input, keyboard or keypad input, etc.

Next, the process 2400 determines (at 2410) whether the received input is for rotating the view of the map. In some embodiments, a multi-touch gesture input, such as the input described above by reference to FIG. 1, is defined for rotating the view of the map. Additional and/or different inputs are defined for rotating the view of the map in some embodiments.

When the process 2400 determines that the received input is not for rotating the view of the map, the process 2400 proceeds to 2425. When the process 2400 determines that the received input is for rotating the view of the map, the process 2400 determines (at 2415) whether map labels rotated past a threshold angle (e.g., 10 degrees, 15 degrees, 25 degrees, etc.). In some embodiments, the angle that the process 2400 uses for this determination is formed by (1) a vector along a particular road label that starts from the center of the particular road label and projects towards the end of the particular road label and (2) a vector that starts from the center of the particular road label and projects upwards along a vertical axis of the GUI of the mapping application.

If the process 2400 determines that no map labels rotated past a. threshold angle, the process 2400 proceeds to 2440. Otherwise, the process 2400 provides (at 2420) a transition to display inverted versions of the map labels and then proceeds to 2440. In some embodiments, the process 2400 provides a transition to display the inverted version of a particular road label by cross fading the particular road label and the inverted version (i.e., right side up version) of the particular road label. In particular, the process 2400 of some such embodiments displays an animation that fades out the particular road label while fading in the inverted version (i.e., the right side up version) of the particular road label. In some embodiments, the process 2400 uses additional and/or different techniques to transition from displaying an upside down road label to displaying a right side up version of the road label.

At 2425, the process 2400 determines whether the received input is for adjusting the zoom (i.e., distance) of the view of the map. In some embodiments, a multi-touch gesture input, such as the input described above by reference to FIG. 2, is defined for adjusting the zoom of the view of the map. Additional and/or different inputs are defined for adjusting the zoom of the view of the map in some embodiments.

When the process 2400 determines that the received input is not for adjusting the view of the view of the map, the process 2400 proceeds to 2440, Otherwise, the process 2400 determines (at 2430) whether styles have changed for any map labels. In some embodiments, the styling of the map labels includes the type of font, the color, and the size of the characters to use for the different map labels. As explained above, some embodiments determine the styling of map labels based on localization factors, such as language settings, time zone settings, etc., and/or a style sheet that specifies styling of the map labels. In some embodiments, the style sheet specifies styling according to the type of map element and/or map construct (e.g., a freeway, a suburban street, a city, a state, a continent, etc.) for which map labels are rendered, the type of device (e.g., a smartphone, a table computing device, a desktop computer, a laptop computer, etc.) for which the mapping application is operating, etc.

If the process 2400 determines that styles have not changed for any map labels, the process 2400 proceeds to 2440. Otherwise, process 2400 provides (at 2435) a transition to display map labels with new styles. In some embodiments, the process 2400 provides a transition to display the map labels with new styles by cross fading the map labels and a version of the map labels with the new styles. That is, the process 2400 of some embodiments displays an animation that fades out the map labels that have changes styles while fading in the version of the map labels with the new styles. The process 2400 of some embodiments uses additional and/or different techniques to transition from displaying map labels with a first style to displaying the map labels with a second style.

Finally, the process 2400 determines (at 2420) whether any input to modify the view of the map is received. When the process 2400 determines that input to modify the view of the map is received, the process 2400 returns to 2410 to process the input. Otherwise, the process 2400 ends.

Figure 25:
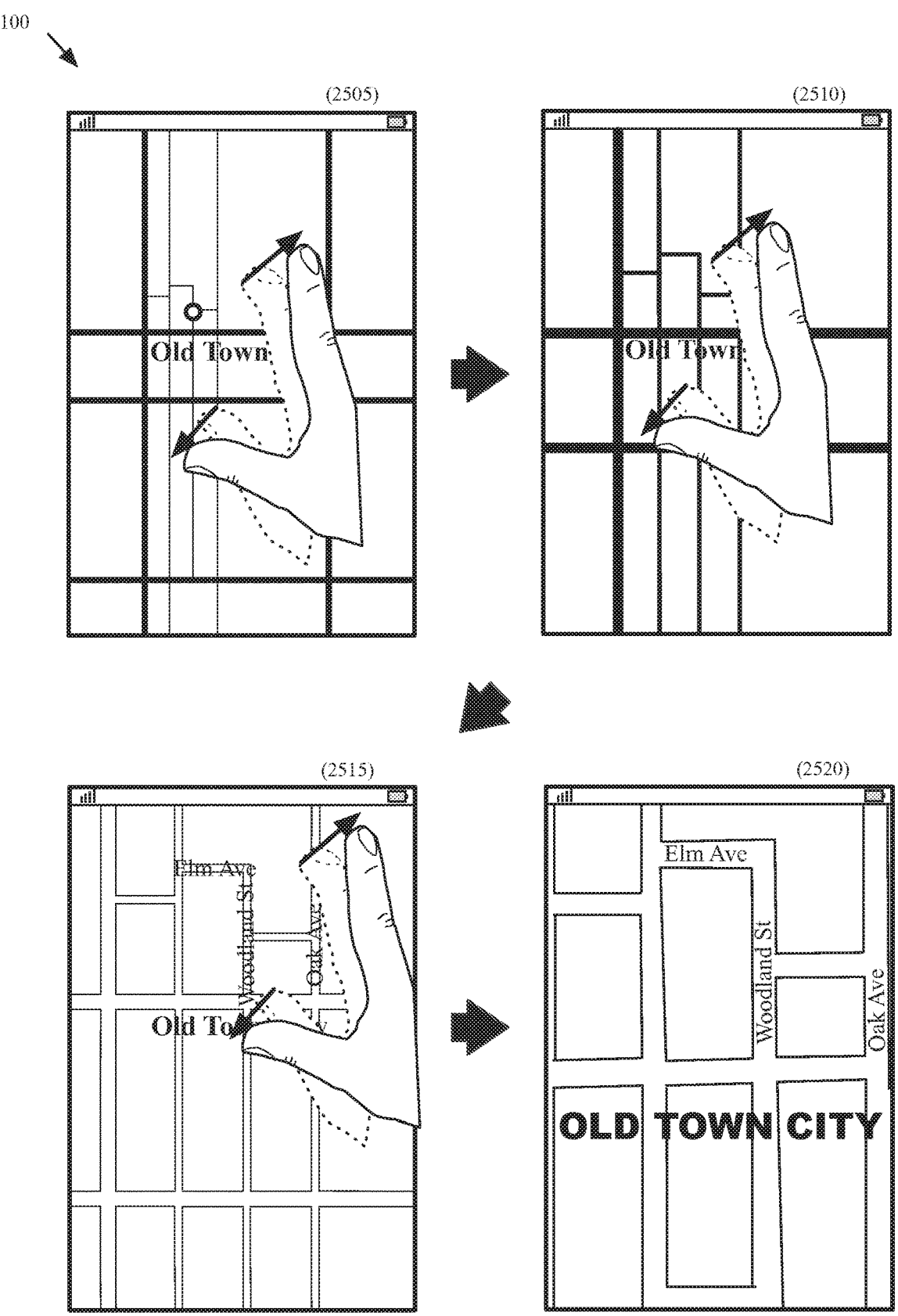
FIG. 25 conceptually illustrates a mapping application of some embodiments rendering different styles of map labels and/or different map labels based on different zoom levels from which a map is viewed.

FIG. 25 conceptually illustrates a mapping application of some embodiments rendering different styles of map labels and/or different map labels based on different zoom levels from which a map is viewed. In particular, FIG. 25 illustrates the GUI 100 of the mapping application of some embodiments operating on a device (e.g., a mobile device, a table computing device, etc.) at four different stages 2505-2520 of zooming into a view of the map.

The first stage 2505 shows the GUI 100 displaying a view of the map. In some embodiments, map view is a view of a 2D map while, in other embodiments, or the map view is a top-down view of a 3D map. In the first stage 2505, the map view includes several roads, a city indicator, and a city label indicating the name of the city ("Old Town City" in this example). As shown, some of the roads are displayed as thicker lines to indicate a type of road (e.g., highway roads, expressway roads, arterial roads, etc.) while some of the other roads are displayed as thinner lines to indicate another type of road (e.g., collector roads, back roads, etc.).

In addition, the first stage 2505 shows a user performing a zoom operation in order to zoom into the view of the map (i.e., to view the map at a closer distance). In this example, the user is providing a multi-touch gesture by placing two fingers on a touchscreen of the device and moving the two fingers in directions away from each other in order to zoom into the map view.

The second stage 2510 illustrates the GUI 100 after the user has completed the zoom operation on the map view in the first stage 2505. As illustrated, the roads in this stage are thicker and the city indicator is no longer displayed as a result of the zooming operation. In some embodiments, the mapping application maintains the same size font of map labels when the view of the map is zoomed in. As shown, the city label "Old Town City" remains the same size relative to the GUI 100 even though the view of the map in the second stage 2510 is closer compared to the view of the map in the first stage 2505.

The second stage 2510 also illustrates the user performing another zoom operation in order to zoom further into the view of the map. The user in this example is providing a multi-touch gesture by placing two fingers on a touchscreen of the device and moving the two fingers in directions away from each other in order to zoom into the map view.

The third stage 2515 illustrates the GUI 100 after the user has completed the zoom operation on the map view in the second stage 2510. As illustrated, the roads in this stage are thicker and several road labels ("Elm Ave", "Woodland St", and "Oak Ave" in this example) are displayed as a result of the zooming operation. As mentioned above, the mapping application of some embodiments maintains the same size font of map labels when the view of the map is zoomed in. As illustrated in the third stage 2515, the city label "Old Town City" remains the same size relative to the GUI 100 even though the view of the map in the third stage 2515 is closer compared to the view of the map in the second stage 2510.

Additionally, the third stage 2515 shows the user performing yet another zoom operation in order to zoom even further into the view of the map. In this example, the user is providing a multi-touch gesture by placing two fingers on a touchscreen of the device and moving the two fingers in directions away from each other in order to zoom into the map view.

The fourth stage 2520 illustrates the GUI 100 after the user has completed the zoom operation on the map view in the third stage 2515. As shows, the roads in this stage are thicker. In some embodiments, the mapping application changes the styling of map labels when the zoom level passes a threshold level. In this example, the mapping application displays a different style for the city label "Old Town City" by displaying a version of the city label with larger characters (i.e., font size).

Figure 26:
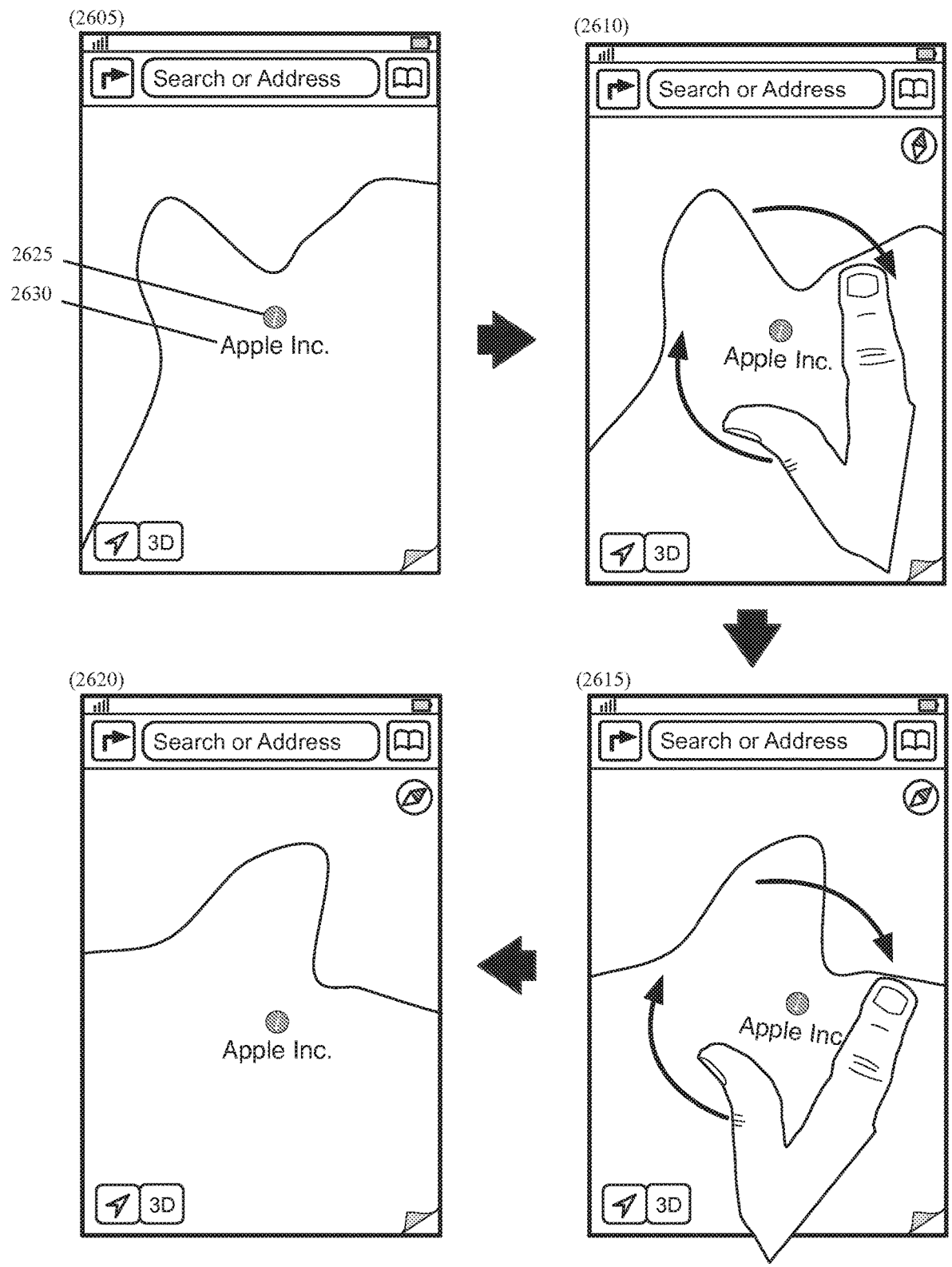
FIG. 26 conceptually illustrates the mapping application of some embodiments rendering map labels when rotating a map.

The previously described FIGS. 1 and 24 illustrate one approach that the mapping application of some embodiments uses to display road labels when a rotate operating is performed on a map. In some embodiments, the mapping application uses other novel techniques to display other map labels in a map view when rotate operations are performed on the map. FIG. 26 illustrates one example of this novel approach in terms of four stages 2605-2620 that show rendering map labels when rotating a map.

The first stage 2605 illustrates a map view that includes a POI indicator 2625 that indicates the location of the POI in the map view and a POI label 2630 that indicates the name of the POI, which is Apple Inc. In this example. As shown in the first stage 2605, the POI indicator 2625 and the POI label 2630 are displayed upright. In the second and third stages 2610 and 2615, the mapping application is rotating the map in response to a rotation operation provided by a user's two-finger multi-touch gesture on a touchscreen of the device on which the mapping application is operating. In both of these stages 2610 and 2615, the POI indicator 2625 and the POI label 2630 are shown to slightly rotate at a much smaller angle than the rotation angle of the map. The behavior of the POI indicator 2625 and the POI label 2630 is as if the POI indicator 2625 and the POI 2630 are pinned at the POI indicator 2625's center or top to the map but their center of gravity points downwards. Hence, whenever the map rotates, the POI indicator 2625 and the POI label 2630 slightly rotate as well, but their center of gravity makes them rotate less and eventually brings the POI indicator 2625 and the POI label 2630 back to their upright positions, These upright positions of the POI indicator 2625 and the POI label 2630 are shown in the fourth stage 2620. This stage shows the map view after the rotation operation has completed.

While FIG. 26 shows an example of the mapping application displaying a POI indicator and POI label when a map is being rotated, the mapping application of some embodiments uses the same or similar approach to display other types of map labels when the map is being rotated. For instance, in some embodiments, the mapping application uses such an approach to display city labels, state labels, continent labels, body of water labels, etc., when the map is being rotated.

Maintaining the constant upright position of map labels while a map is rotated, however, might be a little bit distracting when the map has many map labels and many of them are fighting against the rotation to remain straight up. Accordingly, for some of map labels, the mapping application of some embodiments employs an alternative mechanism to adjust their orientation during a rotation.

Figure 27:
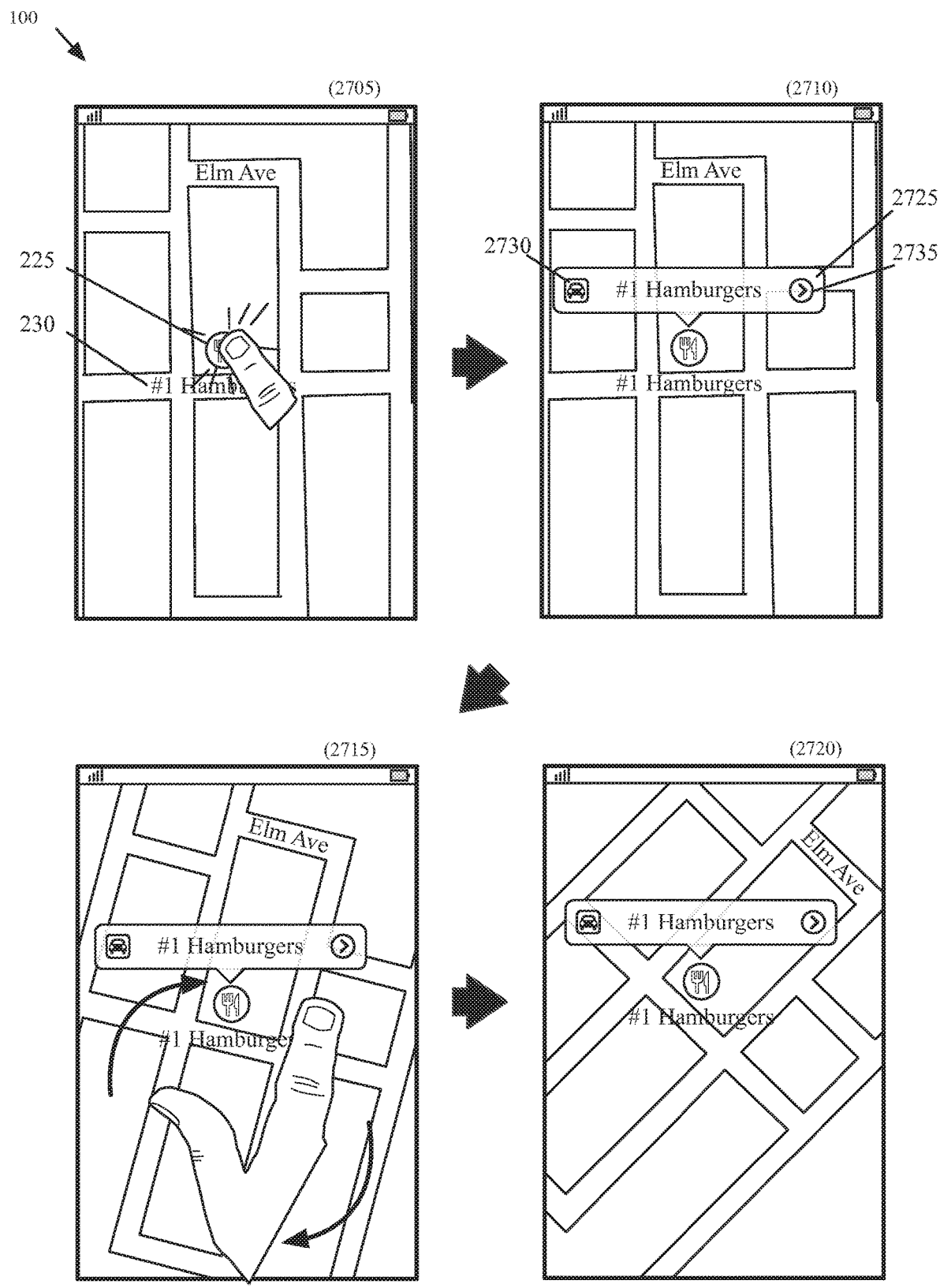
FIG. 27 conceptually illustrates the mapping application of some embodiments rendering POI banner map labels when rotating a map.

FIG. 27 conceptually illustrates the mapping application of some embodiments rendering POI banner map labels when rotating a map. In particular, FIG. 27 illustrates the GUI 100 of the mapping application of some embodiments at four different stages 2705-2720 of rotating a view of a map.

The first stage 2705 is similar to the first stage 205 described above by reference to FIG. 2 except the map view in the first stage 2705 only displays the road label for Elm Ave. In addition, the first stage 2705 of the GUI 100 illustrates a user selecting the POI indicator 225 by using a finger to tap on the touchscreen of the device in order to provide options regarding the POI.

The second stage 2710 illustrates the GUI 100 displaying a banner 2725 in response to the selection of the POI indicator 225. As illustrated, the banner 2725 includes the name of the POI, a selectable UI item 2730 for invoking a route navigation to the POI, and a selectable UI item 2735 for displaying information about the POI.

Next, the third stage 2715 illustrates the user performing a rotate operation in order to rotate the map view. In this example, the user is providing a multi-touch gesture by placing two fingers on the touchscreen and rotating the two fingers in a clockwise direction about a location on the touchscreen (e.g., a midpoint between an initial pair of points where the two fingers touch the touchscreen) in order to rotate the map view in a clockwise direction.

When the mapping application receives the described multi-touch gesture to rotate the map view, the mapping application of some embodiments rotates the map view and the road labels in the map view, but continues to display the POI indicator 225, POI label 230, and the banner 2725 in an upright manner. As shown in the third stage 2715, the mapping application has rotated the road label "Elm Ave" in a clockwise direction about the center of the road label the same degree that the map view has been rotated. Additionally, the mapping application maintains displaying the POI indicator 225, POI label 230, and the banner 2725 upright.

The fourth stage 2720 illustrates the map view after the user has finished rotating the map view. As illustrated the mapping application in the fourth stage 2720 has rotated the map view further in the clockwise direction than that shown in the third stage 2715. The mapping application has also rotated the road label "Elm Ave" further in the clockwise direction about the center of the road label the same degree as the rotation of the map view. For the POI indicator 225, POI label 230, and the banner 2725, the mapping application displayed them upright throughout the rotation of the map view.

Although FIG. 27 shows an example of the mapping application displaying a POI indicator, POI label, and a user-invoked banner for the POI when a map is being rotated, in some embodiments, the mapping application uses the same or similar technique to display other types of map labels and/or user-invoked map labels when the map is being rotated. For instance, the mapping application of some embodiments uses such a technique for displaying user-invoked banners for user-specified graphical location indicators (e.g., pins).

Many of the details, examples, and embodiments described above (e.g., FIGS. 1, 2, and 25-27) are shown with the mapping application rendering map views from a 2D perspective of a 3D map (i.e., a top-down view of the 3D map) for purposes of explanation and simplicity. However, one of ordinary skill in the art will realize that the invention is not limited to those details, examples, and embodiments. That is, the mapping application of some embodiments uses the same or similar techniques described in those details, examples, and embodiments when rendering map views from a 3D perspective of the 3D map.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 28:
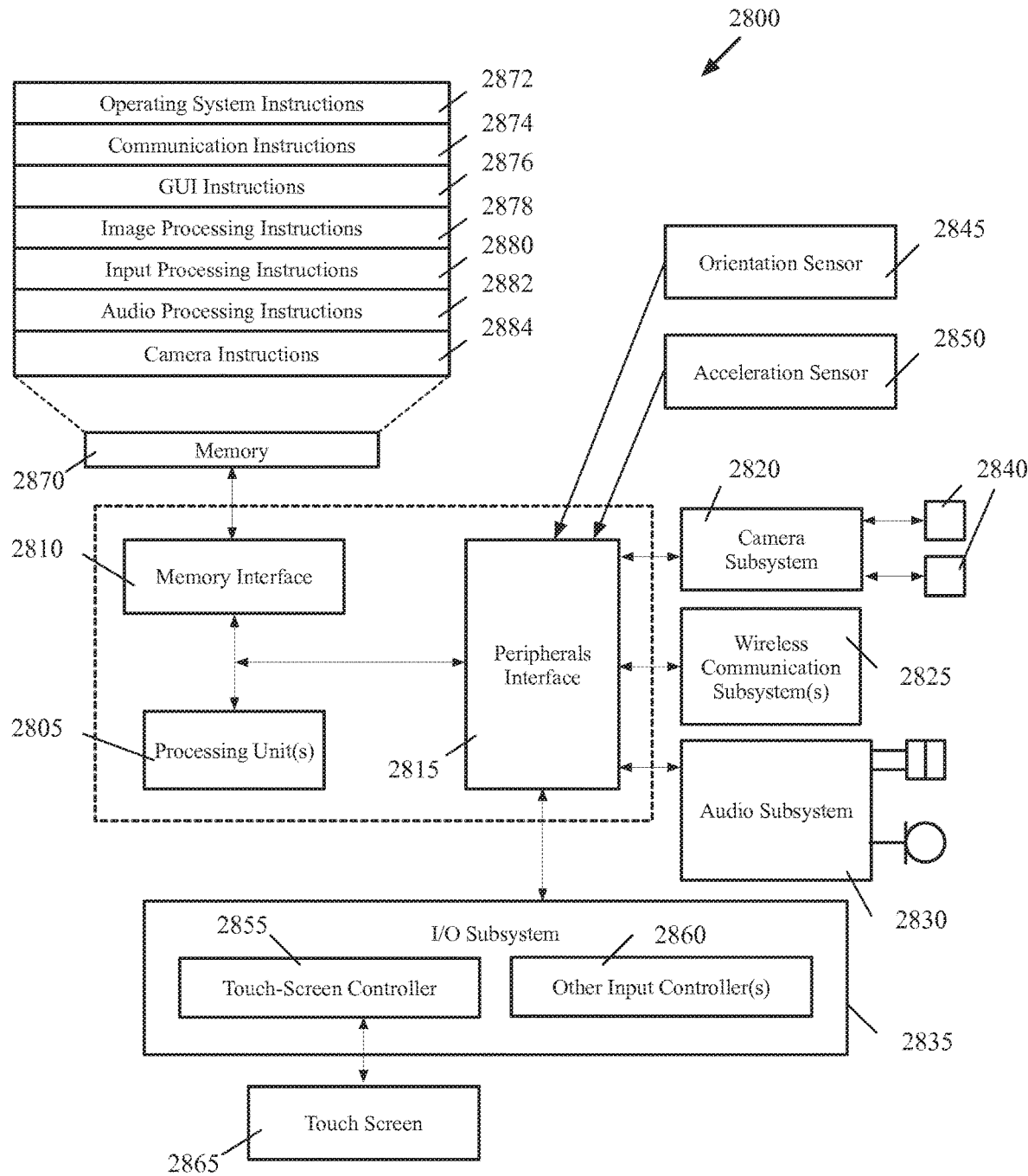
FIG. 28 is an example of an architecture of a mobile computing device.

The mapping application of some embodiments operate on mobile devices, such as smart phones (e.g., iPhones●) and tablets (e.g., iPads●). FIG. 28 is an example of an architecture 2800 of such a mobile computing device. Examples of mobile computing devices include smartphones, tablets, laptops, etc. As shown, the mobile computing device 2800 includes one or more processing units 2805, a memory interface 2810 and a peripherals interface 2815.

The peripherals interface 2815 is coupled to various sensors and subsystems, including a camera subsystem 2820, a wireless communication subsystem(s) 2825, an audio subsystem 2830, an I/O subsystem 2835, etc. The peripherals interface 2815 enables communication between the processing units 2805 and various peripherals. For example, an orientation sensor 2845 (e.g., a gyroscope) and an acceleration sensor 2850 (e.g., an accelerometer) is coupled to the peripherals interface 2815 to facilitate orientation and acceleration functions.

The camera subsystem 2820 is coupled to one or more optical sensors 2840 (e.g., a charged coupled device (CCD) optical sensor, a complementary metal-oxide-semiconductor (CMOS) optical sensor, etc.). The camera subsystem 2820 coupled with the optical sensors 2840 facilitates camera functions, such as image and/or video data capturing. The wireless communication subsystem 2825 serves to facilitate communication functions. In some embodiments, the wireless communication subsystem 2825 includes radio frequency receivers and transmitters, and optical receivers and transmitters (not shown in FIG. 28). These receivers and transmitters of some embodiments are implemented to operate over one or more communication networks such as a GSM network, a Wi-Fi network, a Bluetooth network, etc.

The audio subsystem 2830 is coupled to a speaker to output audio (e.g., to output voice navigation instructions). Additionally, the audio subsystem 2830 is coupled to a microphone to facilitate voice-enabled functions, such as voice recognition (e.g., for searching), digital recording, etc.

The I/O subsystem 2835 involves the transfer between input/output peripheral devices, such as a display, a touchscreen, etc., and the data bus of the processing units 2805 through the peripherals interface 2815. The I/O subsystem 2835 includes a touchscreen controller 2855 and other input controllers 2860 to facilitate the transfer between input/output peripheral devices and the data bus of the processing units 2805. As shown, the touchscreen controller 2855 is coupled to a touchscreen 2865. The touchscreen controller 2855 detects contact and movement on the touchscreen 2865 using any of multiple touch sensitivity technologies, The other input controllers 2860 are coupled to other input/control devices, such as one or more buttons. Some embodiments include a near-touch sensitive screen and a corresponding controller that can detect near-touch interactions instead of or in addition to touch interactions.

The memory interface 2810 is coupled to memory 2870. In some embodiments, the memory 2870 includes volatile memory (e.g., high-speed random access memory), non-volatile memory (e.g., flash memory), a combination of volatile and non-volatile memory, and/or any other type of memory. As illustrated in FIG. 28, the memory 2870 stores an operating system (OS) 2872. The OS 2872 includes instructions for handling basic system services and for performing hardware dependent tasks.

The memory 2870 also includes communication instructions 2874 to facilitate communicating with one or more additional devices; graphical user interface instructions 2876 to facilitate graphic user interface processing; image processing instructions 2878 to facilitate image-related processing and functions; input processing instructions 2880 to facilitate input-related (e.g., touch input) processes and functions; audio processing instructions 2882 to facilitate audio-related processes and functions; and camera instructions 2884 to facilitate camera-related processes and functions. The instructions described above are merely exemplary and the memory 2870 includes additional and/or other instructions in sonic embodiments. For instance, the memory for a smartphone may include phone instructions to facilitate phone-related processes and functions. Additionally, the memory may include instructions for a mapping application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 28 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 28 may be split into two or more integrated circuits.

B. Computer System

Figure 29:
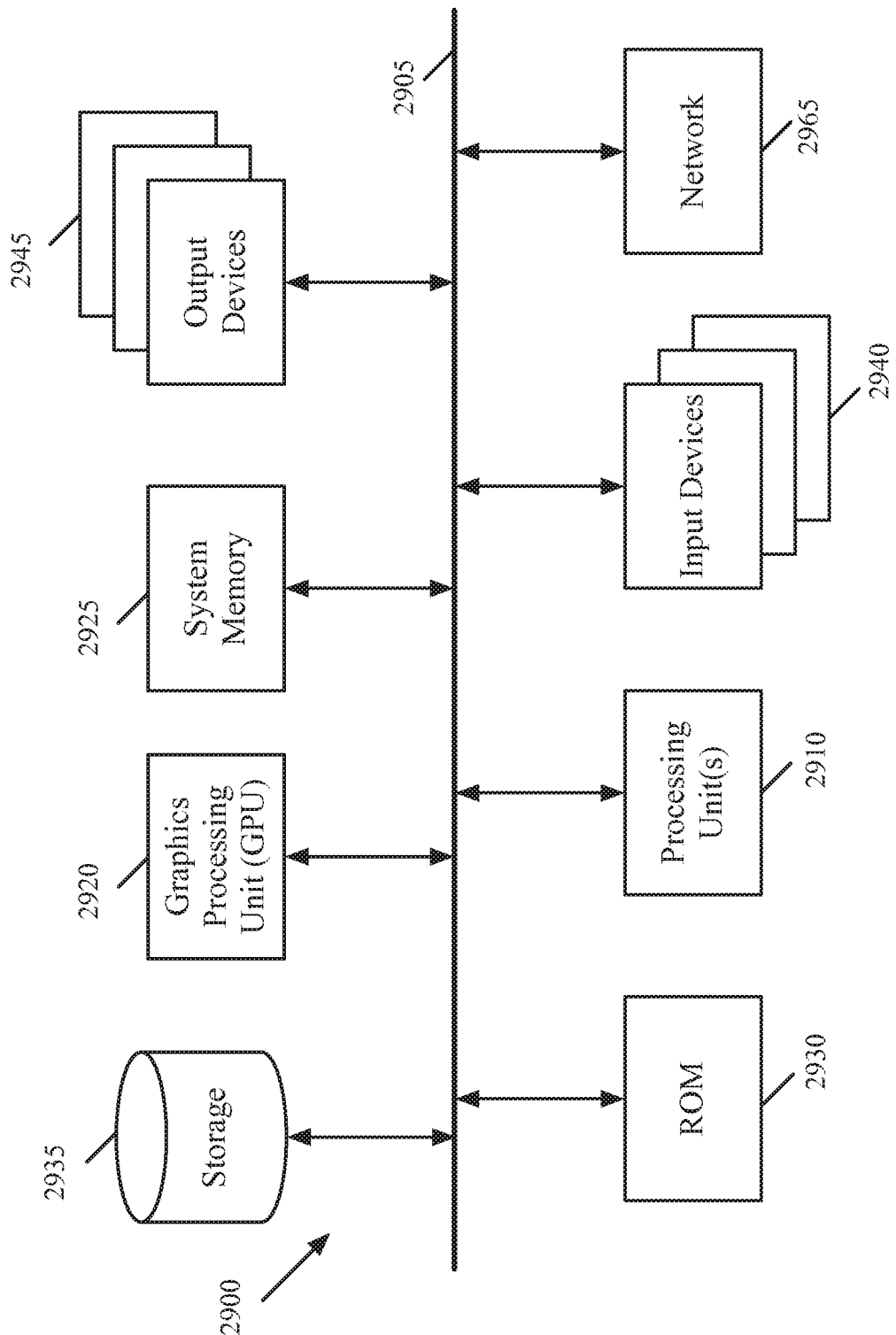
FIG. 29 conceptually illustrates an example of an electronic system with which some embodiments of the invention are implemented.

FIG. 29 conceptually illustrates another example of an electronic system 2900 with which some embodiments of the invention are implemented. The electronic system 2900 may be a computer a desktop computer, personal computer, tablet computer, etc.), phone, PDA, or any other sort of electronic or computing device. Such an electronic system includes various types of computer readable media and interfaces for various other types of computer readable media. Electronic system 2900 includes a bus 2905, processing unit(s) 2910, a graphics processing unit (GPO 2915, a system memory 2920, a network 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the GPU 2915, the system memory 2920, and the permanent storage device 2935.

From these various memory units, the processing unit(s) 2910 retrieves instructions to execute and data to process in order to execute the processes of the invention. The processing unit(s) may be a single processor or a multi-core processor in different embodiments. Some instructions are passed to and executed by the GPU 2915. The CPU 2915 can offload various computations or complement the image processing provided by the processing unit(s) 2910. in some embodiments, such functionality can be provided using CoreImage's kernel shading language.

The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive, integrated flash memory) as the permanent storage device 2935.

Other embodiments use a removable storage device (such as a floppy disk, flash memory device, etc., and its corresponding drive) as the permanent storage device. Like the permanent storage device 2935, the system memory 2920 is a read-and-write memory device. However, unlike storage device 2935, the system memory 2920 is a volatile read-and-write memory, such a random access memory. The system memory 2920 stores some of the instructions and data that the processor needs at runtime, in some embodiments, the invention's processes are stored in the system memory 2920, the permanent storage device 2935, and/or the read-only memory 2930. From these various memory units, the processing unit(s) 2910 retrieves instructions to execute and data to process in order to execute the processes of some embodiments.

The bus 2905 also connects to the input and output devices 2940 and 2945. The input devices 2940 enable the user to communicate information and select commands to the electronic system. The input devices 2940 include alpha-numeric keyboards and pointing devices (also called "cursor control devices"), cameras (e.g., webcams), microphones or similar devices for receiving voice commands, etc. The output devices 2945 display images generated by the electronic system or otherwise output data. The output devices 2945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 29, bus 2905 also couples electronic system 2900 to a network 2925 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-ROM, rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 30:
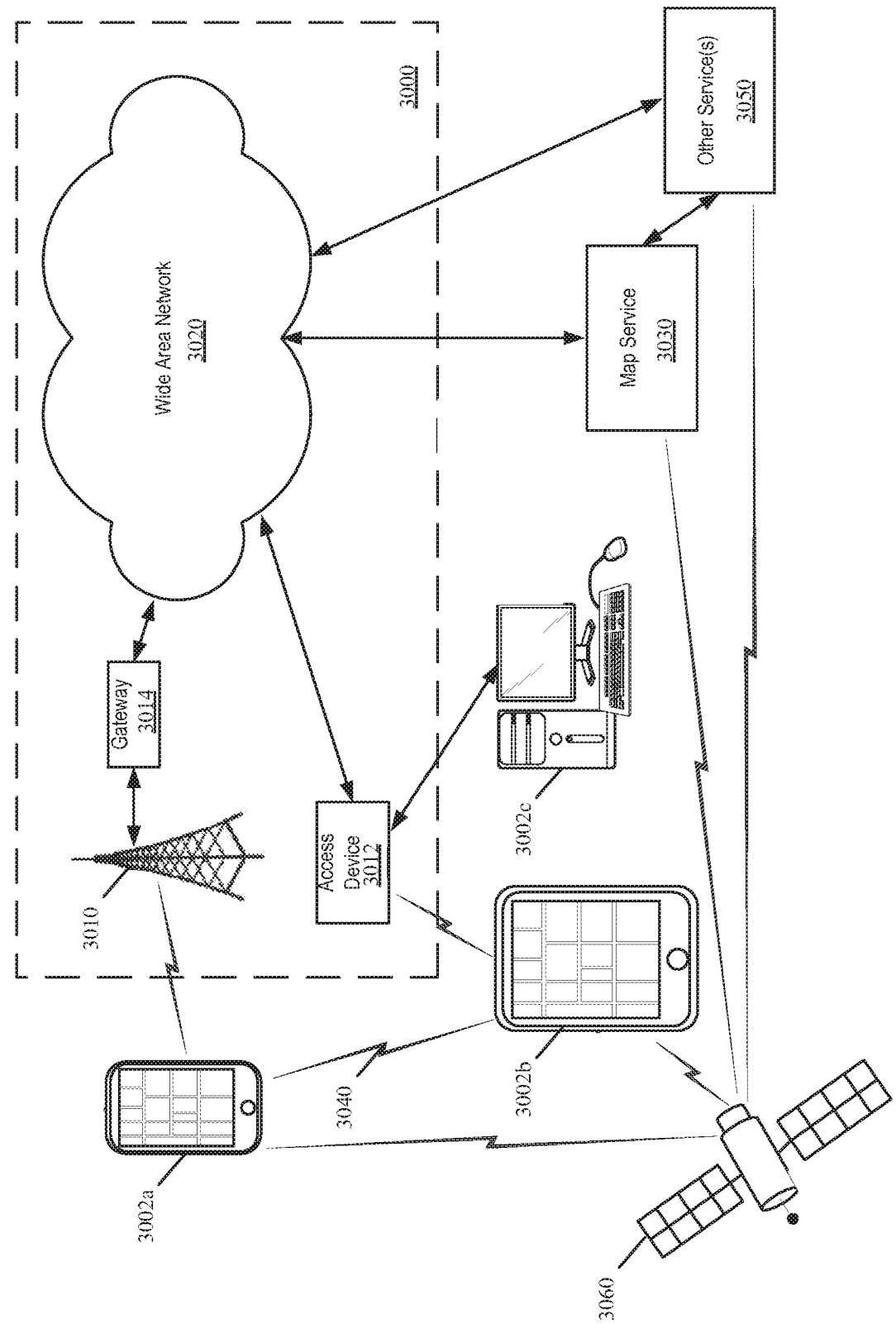
FIG. 30 a map service operating environment according to some embodiments.

Various embodiments may operate within a map service operating environment. FIG. 30 illustrates a map service operating environment, according to some embodiments. A map service 3030 (also referred to as mapping service) may provide map services for one or more client devices 3002a-3002c in communication with the map service 3030 through various communication methods and protocols. A map service 3030 in some embodiments provides map information and other map-related data, such as two-dimensional map image data (e.g., aerial view of roads utilizing CCIs), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 3002a-3002c may utilize these map services by obtaining map service data. Client devices 3002a-3002c may implement various techniques to process map service data. Client devices 3002a-3002c may then provide map services to various entities, including, but not limited to, users, internal software or hardware modules, and/or other systems or devices external to the client devices 3002a-3002c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in sonic embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, CCIs used in map image data may be obtained from external services, or internal systems, storage devices, or nodes. Other examples may include, but are not limited to, GPS assistance servers, wireless network coverage databases, business or personal directories, weather data, government information construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are so one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 3002a-3002c) are implemented on different portable-multifunction device types. Client devices 3002a-3002c utilize map service 3030 through various communication methods and protocols. In some embodiments, client devices 3002a-3002c obtain map service data from map service 3030. Client devices 3002a-3002c request or receive map service data. Client devices 3002a-3002c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation tunas simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) communication capabilities (e.g., device communication bandwidth as determined by wireless signal strength or wired or wireless network type).

FIG. 30 illustrates one possible embodiment of an operating environment 3000 for a map service 3030 and client devices 3002a-3002c. In some embodiments, devices 3002a, 3002b, and 3002c communicate over one or more wired or wireless networks 3010. For example, wireless network 3010, such as a cellular network, can communicate with a wide area network (WAN) 3020, such as the Internet, by use of gateway 3014. A gateway 3014 in some embodiments provides a packet oriented mobile data service, such as General Packet Radio Service (GPRS), or other mobile data service allowing wireless networks to transmit data to other networks, such as wide area network 3020. Likewise, access device 3012 (e.g., IEEE 802.11g wireless access device) provides communication access to WAN 3020. Devices 3002a and 3002b can be any portable electronic or computing device capable of communicating with a map service. Device 3002c can be any non-portable electronic or computing device capable of communicating with a map service.

In some embodiments, both voice and data communications are established over wireless network 3010 and access device 3012. For instance, device 3002a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 3010, gateway 3014, and WAN 3020 (e.g., using Transmission Control Protocol/Internet Protocol (TCP/IP) or User Datagram Protocol (UDP)). Likewise, in some implementations, devices 3002b and 3002c can place and receive phone calls, send and receive e-mail messages, and retrieve electronic documents over access device 3012 and WAN 3020. In various embodiments, any of the illustrated client devices may communicate with map service 3030 and/or other service(s) 3050 using a persistent connection established in accordance with one or more security protocols, such as the Secure Sockets Layer (SSL) protocol or the Transport Layer Security (TLS) protocol.

Devices 3002a and 3002b can also establish communications by other means. For example, wireless device 3002a can communicate with other wireless devices (e.g., other devices 3002b, cell phones, etc.) over the wireless network 3010. Likewise devices 3002a and 3002b can establish peer-to-peer communications 3040 (e.g., a personal area network) by use of one or more communication subsystems, such as Bluetooth● communication from Bluetooth Special Interest Group, Inc. of Kirkland, Wash. Device 3002c can also establish peer to peer communications with devices 3002a or 3002b (not shown). Other communication protocols and topologies can also be implemented. Devices 3002a and 3002b may also receive Global Positioning Satellite (GPS) signals from GPS satellites 3060.

Devices 3002a, 3002b, and 3002c can communicate with map service 3030 over one or more wire and/or wireless networks, 3010 or 3012. For instance, map service 3030 can provide map service data to rendering devices 3002a, 3002b, and 3002c. Map service 3030 may also communicate with other services 3050 to obtain data to implement map services. Map service 3030 and other services 3050 may also receive GPS signals from GPS satellites 3060.

In various embodiments, map service 3030 and/or other service(s) 3050 are configured to process search requests from any of the client devices. Search requests may include but are not limited to queries for businesses, addresses, residential locations, points of interest, or some combination thereof Map service 3030 and/or other service(s) 3050 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated, with the search result (e.g., highest user or editorial review rating), and/or the volume of reviews for the search results (e.g., the number of times the search result has been review or rated).

In various embodiments, map service 3030 and/or other service(s) 3050 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 3030 and/or other service(s) 3050, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 3030 and/or other service(s) 3050 provide one or more feedback mechanisms to receive feedback from client devices 3002*a*-3002*c*. For instance, client devices may provide feedback on search results to map service 3030 and/or other service(s) 3050 (e.g., feedback specifying ratings, reviews, temporary or permanent business closures, errors etc.); this feedback may be used to update information about points of interest in order to provide more accurate or more up-to-date search results in the future. In some embodiments, map service 3030 and/or other service(s) 3050 may provide testing information to the client device (e.g., an A/B test) determine which search results are best. For instance, at random intervals, the client device may receive and present two search results to a user and allow the user to indicate the best result. The client device may report the test results to map service 3030 and/or other services) 3050 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. In addition, a number of the figures (including FIGS. 3, 4, 7, 9, 18, 20, 23, and 24) conceptually illustrate a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine-readable medium storing a mapping application which when executed on a device by at least one processing unit of a device provides views of a map on a touch-sensitive graphical user interface (GUI), the mapping application comprising sets of instructions for:
    presenting, on the touch-sensitive GUI, a map view that includes a map label displayed with a first label style, the map label including a plurality of characters;
    receiving a touch input on the touch-sensitive GUI to adjust a zoom level of the map view;
    while the touch input adjusting the map zoom level of the map view is being received on the touch-sensitive GUI:
        detecting that the zoom level of the map view crosses a first threshold level, and
        updating the presentation of the map view to display the map label with a second label style corresponding to the first threshold level,
        generating respective bounding shapes around each respective character of a first plurality of characters comprised in the map label,
        detecting a collision between the map label and a second label associated with the map view at least by detecting a collision between:
            (a) a first bounding shape around a first character of the plurality of characters comprised in the map label and (b) a second bounding shape around a second character of a second plurality of characters comprised in the second label, and
        in response to detecting the collision between (a) the first bounding shape around the first character of the map label and (b) the second bounding shape around the second character of the second label, adjusting the presentation of the map view to avoid the collision between the map label and the second label.

2. The non-transitory machine-readable medium of claim 1, wherein the map application further comprises sets of instructions for maintaining a font size for the map label when detecting that the zoom level crosses the first threshold level.

3. The non-transitory machine-readable medium of claim 1, wherein the map application further comprises sets of instructions for storing a map label style sheet in the non-transitory machine-readable medium that maps a plurality of map label styles to corresponding map zoom threshold levels.

4. The non-transitory machine-readable medium of claim 3, wherein the map application further comprises sets of instructions for:
    detecting a first zoom level for the map view;
    selecting a particular map label style of the plurality of map label styles based on the detected zoom level and the map label style sheet; and
    based on the selection, displaying the map label with the selected map label style.

5. The non-transitory machine-readable medium of claim 3, wherein the map application further comprises sets of instructions for:
    while the touch input adjusting the map zoom level of the map view is being received on the touch-sensitive GUI:
        detecting that the zoom level of the map view crosses a second threshold level; and
        updating display of the map view to display the map label with a third label style of the plurality of map label styles corresponding to the second threshold level.

6. The non-transitory machine-readable medium of claim 1, wherein the first label style includes a label color, and wherein the map application further comprises sets of instructions for:
  displaying the map label with the first label style, the first label style including a first label color;
  detecting that the zoom level of the map view crosses the first threshold level; and
  in response to detecting that the zoom level crosses the first threshold level, displaying the map label with the second label style, wherein the second label style includes a second label color.

7. The non-transitory machine-readable medium of claim 1, wherein the first label style includes a label size, and wherein the map application further comprises sets of instructions for:
  displaying the map label with the first label style, the first label style including a first label size;
  detecting that the zoom level of the map view crosses the first threshold level; and
  in response to detecting that the zoom level crosses the first threshold level, displaying the map label with the second label style, wherein the second label style includes a second label size.

8. The non-transitory machine-readable medium of claim 1, wherein the first label style includes a label font type, and wherein the map application further comprises sets of instructions for:
  displaying the map label with the first label style, the first label style including a first label font type;
  detecting that the zoom level of the map view crosses the first threshold level; and
  in response to detecting that the zoom level crosses the first threshold level, displaying the map label with the second label style, wherein the second label style includes a second label font type.

9. The non-transitory machine-readable medium of claim 1, wherein the first label style includes a label font style, and wherein the map application further comprises sets of instructions for:
  displaying the map label with the first label style, the first label style including a first label font style;
  detecting that the zoom level of the map view crosses the first threshold level; and
  in response to detecting that the zoom level crosses the first threshold level, displaying the map label with the second label style, wherein the second label style includes a second label font style.

10. For a mapping application, a method for providing views of a map on a touch-sensitive graphical user interface (GUI) of a computing device, the method comprising:
  presenting, on the touch-sensitive GUI, a map view that includes a map label displayed with a first label style, the map label including a plurality of characters;
  receiving a touch input on the touch-sensitive GUI to adjust a zoom level of the map view;
  while the touch input adjusting the map zoom level of the map view is being received on the touch-sensitive GUI:
    detecting that the zoom level of the map view crosses a first threshold level, and
    updating the presentation of the map view to display the map label with a second label style corresponding to the first threshold level,
    generating respective bounding shapes around each respective character of a first plurality of characters comprised in the map label,
    detecting a collision between the map label and a second label associated with the map view at least by detecting a collision between:
      (a) a first bounding shape around a first character of the plurality of characters comprised in the map label and (b) a second bounding shape around a second character of a second plurality of characters comprised in the second label, and
    in response to detecting the collision between (a) the first bounding shape around the first character of the map label and (b) the second bounding shape around the second character of the second label, adjusting the presentation of the map view to avoid the collision between the map label and the second label.

11. The method of claim 10, further comprising maintaining a font size for the map label when detecting that the zoom level crosses the first threshold level.

12. The method of claim 10, further comprising storing a map label style sheet in the non-transitory machine-readable medium that maps a plurality of map label styles to corresponding map zoom levels.

13. The method of claim 12, further comprising:
  detecting a first zoom level for the map view;
  selecting a particular map label style of the plurality of map label styles based on the detected zoom level and the map label style sheet; and
  based on the selection, displaying the map label with the selected map label style.

14. The method of claim 12, further comprising:
  while the touch input adjusting the map zoom level of the map view is being received on the touch-sensitive GUI:
    detecting that the zoom level of the map view crosses a second threshold level and
    updating display of the map view to display the map label with a third label style of the plurality of map label styles corresponding to the second threshold level.

15. The method of claim 10, wherein the first label style includes a label color, further comprising:
  displaying the map label with the first label style, the first label style including a first label color;
  detecting that the zoom level of the map view crosses the first threshold level; and
  in response to detecting that the zoom level crosses the first threshold level, displaying the map label with the second label style, wherein the second label style includes a second label color.

16. The method of claim 10, wherein the first label style includes a label size, further comprising:
  displaying the map label with the first label style, the first label style including a first label size;
  detecting that the zoom level of the map view crosses the first threshold level; and
  in response to detecting that the zoom level crosses the first threshold level, displaying the map label with the second label style, wherein the second label style includes a second label size.

17. The method of claim 10, wherein the first label style includes a label font type, further comprising:
  displaying the map label with the first label style, the first label style including a first label font type;
  detecting that the zoom level of the map view crosses the first threshold level; and
  in response to detecting that the zoom level crosses the first threshold level, displaying the map label with the second label style, wherein the second label style includes a second label font type.

18. The method of claim 10, wherein the first label style includes a label font style, further comprising:
- displaying the map label with the first label style, the first label style including a first label font style;
- detecting that the zoom level of the map view crosses the first threshold level; and
- in response to detecting that the zoom level crosses the first threshold level, displaying the map label with the second label style, wherein the second label style includes a second label font style.

19. A device comprising:
- a set of processing units; and
- a non-transitory machine-readable medium storing a mapping application which when executed by at least one of the processing units provides views of a map on a touch-sensitive graphical user interface (GUI) of the device, the mapping application comprising sets of instructions for:
  - presenting, on the touch-sensitive GUI, a map view that includes a map label displayed with a first label style, the map label including a plurality of characters;
  - receiving a touch input on the touch-sensitive GUI to adjust a zoom level of the map view;
  - while the touch input adjusting the map zoom level of the map view is being received on the touch-sensitive GUI:
    - detecting that the zoom level of the 3D map view crosses a first threshold level, and
    - updating the presentation of the 3D map view to display the map label with a second label style corresponding to the first threshold level,
    - generating respective bounding shapes around each respective character of a first plurality of characters comprised in the map label,
    - detecting a collision between the map label and a second label associated with the map view at least by detecting a collision between:
      - (a) a first bounding shape around a first character of the plurality of characters comprised in the map label and (b) a second bounding shape around a second character of a second plurality of characters comprised in the second label, and
    - in response to detecting the collision between (a) the first bounding shape around the first character of the map label and (b) the second bounding shape around the second character of the second label, adjusting the presentation of the map view to avoid the collision between the map label and the second label.

20. The device of claim 19, wherein the map application further comprises sets of instructions for maintaining a font size for the map label when detecting that the zoom level crosses the first threshold level.

21. The device of claim 19, wherein the map application further comprises sets of instructions for storing a map label style sheet in the non-transitory machine-readable medium that maps a plurality of map label styles to corresponding map zoom levels.

22. The device of claim 21, wherein the map application further comprises sets of instructions for:
- detecting a first zoom level for the map view;
- selecting a particular map label style of the plurality of map label styles based on the detected zoom level and the map label style sheet; and
- based on the selection, displaying the map label with the selected map label style.

23. The device of claim 21, wherein the map application further comprises sets of instructions for:
- while the touch input adjusting the map zoom level of the map view is being received on the touch-sensitive GUI:
  - detecting that the zoom level of the map view crosses a second threshold level; and
  - updating display of the map view to display the map label with a third label style of the plurality of map label styles corresponding to the second threshold level.

24. The device of claim 19, wherein the first label style includes a label color, and wherein the map application further comprises sets of instructions for:
- displaying the map label with the first label style, the first label style including a first label color;
- detecting that the zoom level of the map view crosses the first threshold level; and
- in response to detecting that the zoom level crosses the first threshold level, displaying the map label with the second label style, wherein the second label style includes a second label color.

25. The device of claim 19, wherein the first label style includes a label size, and wherein the map application further comprises sets of instructions for:
- displaying the map label with the first label style, the first label style including a first label size;
- detecting that the zoom level of the map view crosses the first threshold level; and
- in response to detecting that the zoom level crosses the first threshold level, displaying the map label with the second label style, wherein the second label style includes a second label size.

26. The device of claim 19, wherein the first label style includes a label font type, and wherein the map application further comprises sets of instructions for:
- displaying the map label with the first label style, the first label style including a first label font type;
- detecting that the zoom level of the map view crosses the first threshold level; and
- in response to detecting that the zoom level crosses the first threshold level, displaying the map label with the second label style, wherein the second label style includes a second label font type.

27. The device of claim 19, wherein the first label style includes a label font style, and wherein the map application further comprises sets of instructions for:
- displaying the map label with the first label style, the first label style including a first label font style;
- detecting that the zoom level of the map view crosses the first threshold level; and
- in response to detecting that the zoom level crosses the first threshold level, displaying the map label with the second label style, wherein the second label style includes a second label font style.

* * * * *